US010976253B2

(12) United States Patent
Tajima et al.

(10) Patent No.: US 10,976,253 B2
(45) Date of Patent: Apr. 13, 2021

(54) ABSORBANCE MEASURING DEVICE AND METHOD THEREOF

(71) Applicant: UNIVERSAL BIO RESEARCH Co., Ltd., Matsudo (JP)

(72) Inventors: Hideji Tajima, Matsudo (JP); Takaki Sugimoto, Matsudo (JP); Tetsuya Ueda, Matsudo (JP)

(73) Assignee: UNIVERSAL BIO RESEARCH CO., LTD., Chiba (JP)

( * ) Notice: Subject to any disclaimer, the term of this patent is extended or adjusted under 35 U.S.C. 154(b) by 0 days.

(21) Appl. No.: 16/060,556

(22) PCT Filed: Dec. 14, 2016

(86) PCT No.: PCT/JP2016/087181
§ 371 (c)(1),
(2) Date: Jun. 8, 2018

(87) PCT Pub. No.: WO2017/104693
PCT Pub. Date: Jun. 22, 2017

(65) Prior Publication Data
US 2019/0003965 A1    Jan. 3, 2019

(30) Foreign Application Priority Data

Dec. 15, 2015    (JP) .............................. JP2015-244602

(51) Int. Cl.
*G01N 21/59*    (2006.01)
*G01N 21/11*    (2006.01)
(Continued)

(52) U.S. Cl.
CPC ............. *G01N 21/59* (2013.01); *G01N 21/11* (2013.01); *G01N 21/253* (2013.01); *G01N 21/31* (2013.01);
(Continued)

(58) Field of Classification Search
CPC .. G01N 21/59; G01N 2021/598; G01N 11/21; G01N 2201/0846
See application file for complete search history.

(56) References Cited

U.S. PATENT DOCUMENTS 4,538,618 A * 9/1985 Rosenberg ........... A61B 5/0059
600/407
6,396,584 B1    5/2002 Taguchi et al.
(Continued)

FOREIGN PATENT DOCUMENTS

EP    1 054 250    11/2000
JP    63-118665 A    5/1988
(Continued)

OTHER PUBLICATIONS

Pipetman CLassic Flyer, Gilson Manufacturing, 2019 (Year: 2019).*
(Continued)

*Primary Examiner* — Rebecca C Bryant
(74) *Attorney, Agent, or Firm* — Andrus Intellectual Property Law, LLP

(57) ABSTRACT

A highly-reliable absorbance measuring device that enables highly-accurate measurement of absorbance, and a method thereof are provided.
A liquid containing unit that can contain a chemical substance solution to be measured, a nozzle that communicates with a suction/discharge mechanism that sucks/discharges gas, a flow tube that includes a mouth part, which can be inserted into the liquid containing unit, at a lower end and that is detachably attached to the nozzle at an upper end, an emitting end that can emit measurement light, a light receiving end that can receive the light emitted from the emitting end, and a control unit are included. The control unit is configured to suck a prescribed amount of the chemical substance solution into the flow tube, and to lead absorbance
(Continued)

on the basis of intensity of transmitted light acquired by emission of measurement light in a vertical direction into the flow tube.

12 Claims, 11 Drawing Sheets

(51) Int. Cl.
  *G01N 21/25* (2006.01)
  *G01N 21/31* (2006.01)
  *G01N 21/82* (2006.01)
(52) U.S. Cl.
  CPC ....... *G01N 21/82* (2013.01); *G01N 2021/825* (2013.01); *G01N 2201/0846* (2013.01)

(56) References Cited

U.S. PATENT DOCUMENTS

2010/0167412 A1   7/2010   Xiao et al.
2013/0183769 A1   7/2013   Tajima

FOREIGN PATENT DOCUMENTS

JP   2004205415 A   7/2004
JP   2012251821 A   12/2012
WO   1987/06008   10/1987

OTHER PUBLICATIONS

International Search Report (English translation) issued by the Japanese Patent Office regarding International Application No. PCT/JP2016/087181, dated Feb. 28, 2017, 2 pages.
International Search Report and Written Opinion issued by the Japanese Patent Office regarding International Application No. PCT/JP2016/087181, dated Feb. 28, 2017, 8 pages.
Written Opinion issued by the Japanese Patent Office regarding International Application No. PCT/JP2016/087181, dated Jan. 9, 2018, 5 pages.
International Preliminary Report on Patentability issued by the Japanese Patent Office regarding International Application No. PCT/JP2016/087181 dated Mar. 27, 2018, 5 pages.

* cited by examiner

ABSORBANCE MEASURING DEVICE AND METHOD THEREOF

CROSS REFERENCE

This application is a United States national phase application of co-pending international patent application number PCT/JP2016/087181, filed Dec. 14, 2016, which claims priority to Japanese patent application number 2015-244602, filed Dec. 15, 2015, the entire disclosures of which are hereby incorporated herein by reference.

TECHNICAL FIELD

The present invention relates to an absorbance measuring device to measure absorbance of various chemical substance solutions to be measured, and a method thereof.

BACKGROUND ART

Conventionally, in order to measure absorbance of a chemical substance solution including a chemical substance such as various biopolymers such as a nucleic acid and protein, the solution to be an object is contained in a quartz cell, light at a predetermined wavelength λ which light can be transmitted through the quartz cell and can be absorbed by the chemical substance is emitted vertically to a predetermined side surface of the quartz cell, a ratio of incident light intensity $I_0$ and transmitted light intensity I (transmittance) is measured, and absorbance $A_\lambda$ is calculated from $A_\lambda = -\log_{10}(I/I_0)$.

For example, in a case where absorbance of a biopolymer substance such as a nucleic acid is measured as a chemical substance, as light at a wavelength that can be absorbed by the nucleic acid, ultraviolet light around 260 nm is used as measurement light (light emitted to measure absorbance, same shall be applied hereinafter). This is because a base included in a nucleic acid of DNA, RNA, or an oligonucleotide has an absorption peak around this. Also, generally, in a case where absorbance of various solutions (including suspension) of various biopolymer substances such as protein, a body tissue, a colloidal substance, an aggregation of various substances, various solids, and the like is measured in addition to a nucleic acid, there is measurement light having an appropriate wavelength for each thereof.

Incidentally, in a case where measurement light is emitted/received from the outside of a container or the like that contains a chemical substance solution to be measured horizontally through a sidewall of the container, the measurement light passes through two sidewalls. Thus, even when the sidewalls are transparent members, absorption of the measurement light may not be ignored. Also, since the measurement light receives absorption, diffusion, refraction, and the like by the solution in addition to reflection, refraction, and absorption by the sidewalls and absorption by a measurement object in the container, there is a possibility that the measurement light is lost due to a reason other than absorption and correct absorbance cannot be acquired.

In order to decrease an influence of the sidewalls of the container on the measurement light, an optical member of an optimal container is used according to used measurement light. For example, it is difficult to use glass that is often used as a material of an optical component since an attenuation coefficient is significantly increased and transmittance is rapidly decreased in a wavelength region of ultraviolet light. Thus, a special optical component using a special material (such as quartz glass [that can be used at wavelength of 200 nm or higher] or calcium fluoride, magnesium fluoride [that can be used in 150 nm or higher]) is used, and a solution to be measured is contained in a cell container formed of these materials. Then, by an emitting end and a light receiving end provided on a side surface in such a manner as to sandwich the container, measurement light is emitted to the side surface, whereby absorbance is measured. However, these materials are expensive and may cause an increase in a production cost of a device. In addition, there is a problem that an optical length is limited to a distance between facing sidewalls of a container in a case of measurement in a horizontal direction and that an optical length may be limited by a size of a container or an amount of liquid in a case of measurement in a vertical direction.

When an optical length is limited, there is a possibility that it is difficult to set an appropriate optical length and to increase measurement accuracy. For example, it is possible to increase measurement accuracy by making an optical length short in a case where transmittance of a solution to be measured is low (case where concentration is high) and by making an optical length long in a case where transmittance is high (concentration is low) when intensity of measurement light is the same. Specifically, in a case where an amount of a solution to be measured is a little, there is a problem that a cell container for measurement cannot be filled and a determined optical length cannot be acquired.

Thus, an inventor of the present application has invented a cartridge container, in which wells having a plurality of kinds of shapes with a plurality of kinds of optical lengths are provided, and has made it possible to use a plurality of kinds of optical lengths corresponding to a measurement object. In this case, there is a possibility that a shape of a container becomes complicated and a size of the container is increased when kinds of optical lengths are increased.

On the other hand, in a case where measurement is not performed from the outside of a container containing a solution and measurement is performed inside the container, an optical path that is not blocked by a wall surface of a glass container or an optical path that does not sandwich the wall surface of the glass container can be set. Thus, it is possible to perform measurement without using a special optical component such as quartz glass. However, with respect to the glass container that contains a solution, absorbance is measured with an emitting end that emits measurement light and a light receiving end that receives transmitted light transmitted through the chemical substance solution being soaked in the solution. In this case, since the emitting end and the light receiving end are in contact with the solution to be measured, there are the following problems. That is, there is a possibility of cross contamination, and there is a possibility that a disposable emitting end or light receiving end is used and a cost or a burden is increased, an amount of liquid necessary for measurement is increased, and a structure of a measuring device becomes complicated and large-scaled.

CITATION LIST

Patent Literature

Patent Literature 1: WO 2012/036296 A
Patent Literature 2: JP 2004-205415 A

SUMMARY OF INVENTION

Technical Problem

The present invention is provided to solve the above problems, and a first purpose thereof is to provide an absorbance measuring device that controls an amount of liquid necessary for measurement by containing or holding a solution to be measured in a shape having a cross section in a degree in which passage of measurement light is possible, and that can acquire highly accurate absorbance with respect to various amounts of measurement objects by removal or minimization of a member such as a wall of a container that blocks the measurement light and by removal or reduction of an optical influence of the member on the measurement light, and to provide a method thereof.

A second purpose of this is to provide an absorbance measuring device that can set an appropriate optical length with respect to various amounts of chemical substance solutions including various chemical substances with various molecular weights or sizes such as a high-molecular substance, a solid, foam, gas, or liquid (including suspension in which chemical substance is dispersed), that can emit measurement light having an appropriate wavelength, and that can perform highly versatile measurement with respect to absorbance of the various chemical substance solutions, and to provide a method thereof.

A third purpose of this is to provide an absorbance measuring device that can measure absorbance of various solutions including a chemical substance without using various special optical components and the like that can transmit light having various wavelengths such as ultraviolet light or by using this in a minimum part, that can be produced inexpensively, and that can prevent an increase in a device scale, and to provide a method thereof.

A fourth purpose of this is to provide an absorbance measuring device that can prevent cross contamination and can measure absorbance of a solution highly reliably and accurately, and to provide a method thereof.

A fifth purpose of this is to provide an absorbance measuring device that can consistently perform processing of extracting a nucleic acid from a sample, measuring absorbance of the solution, adjusting concentration, and the like and can perform a plurality of kinds of processing in parallel, and to provide a method thereof.

A first invention is an absorbance measuring device including: one or more liquid containing units that can contain a chemical substance solution to be measured; one or more nozzles that communicate with a suction/discharge mechanism that sucks/discharges gas; one or more flow tubes each of which is, at a lower end, a mouth part that can be inserted into each of the liquid containing units and is detachably attached to each of the nozzles at an upper end; one or more emitting ends that can emit measurement light; one or more light receiving ends that can receive the light emitted from the emitting ends; and a control unit that at least controls the suction/discharge mechanism and leads absorbance of the chemical substance solution, wherein one of (a group of) the emitting end(s) and (a group of) the light receiving end(s) is provided in the nozzles or the suction/discharge mechanism, (respectively), and the other of (the group of) the emitting end(s) and (the group of) the light receiving end(s) is provided outside the flow tubes in such a manner that the mouth parts of the flow tubes can be placed on an upper side thereof, (respectively), and the control unit controls in such a manner that a prescribed amount of the chemical substance solution is sucked into the flow tubes attached to the nozzles, the mouth parts of the flow tubes are placed on the upper side of the other of (the group of) the emitting end(s) and (the group of) the light receiving end(s), and the absorbance is led on the basis of intensity of transmitted light of the chemical substance solution which light is the measurement light emitted from the emitting ends in a vertical direction through the flow tubes and received at the light receiving ends.

Here, a "chemical substance" is a substance used for a chemical reaction and is, for example, a genetic material such as a nucleic acid, or a biochemical substance such as protein, sugar, or peptide. A "flow tube" includes a dispensing flow tube that performs agitation of liquid in one liquid containing unit, and moving and dispensing of liquid between a plurality of liquid containing units by sucking and discharging of the liquid, and a photometric flow tube in which intensity of transmitted light in a vertical direction thereof is measured with respect to a solution sucked inside. For example, it is preferable that a sidewall part of the photometric flow tube is formed of a black substance as a light blocking member or formed of a translucent material to which a black paint is applied or which is covered thereby, and that outside light is blocked. In a case where a black substance is included, a black pigment is kneaded into resin and molding is performed. There is a case where the dispensing flow tube and the photometric flow tube double as each other. Since a flow tube is attached to a nozzle detachably, it is preferable that a detachment mechanism to detach the flow tube from the nozzle is provided, for example, in a nozzle head (described later) and that a flow tube containing unit into which the flow tube is contained in an attachable manner by a downward movement of the nozzle is provided in the containing unit group.

"Measurement light" is light emitted to measure absorbance of a chemical substance solution to be measured. The measurement light is light that can be absorbed by a chemical substance included in the chemical substance solution to be measured. The measurement light is light at a predetermined wavelength, light in a predetermined wavelength region, white light, or the like and is, for example, visible light, infrared light, ultraviolet light, or the like as light. In a case where the measurement light is light at a predetermined wavelength or light in a predetermined wavelength region, measured absorbance is absorbance with respect to the light at the predetermined wavelength or absorbance of the light in the predetermined wavelength region. Note that even when measurement light is white light, it is possible to measure absorbance of light at a predetermined wavelength or light in a predetermined wavelength region by measuring intensity of a predetermined wavelength component or a predetermined wavelength region component of incident light of measurement light and that of transmitted light thereof with an optical filter or a spectroscope. Here, the predetermined wavelength or the predetermined wavelength region is, for example, a wavelength or a wavelength region in which light can be absorbed by a chemical substance. For example, in a case of a nucleic acid such as DNA, RNA, or an oligonucleotide, ultraviolet light around 260 nm is appropriate as measurement light. This is because a base of a nucleic acid has an absorption peak around this (A: 259 nm, T: 267 nm, G: 253 nm, and C: 267 nm). Also, a value of absorption is influenced by a structure (single strand or double strand), a length, and a base composition of a nucleic acid. An "emitting end (or light receiving end)" is an end part of a light guiding path which end can emit (or receive) light and may include an optical element such as a lens.

A "flow tube" is a tubular member that has a mouth part at a lower end and has an opening part for attachment, which part is detachably attached to the nozzle, at an upper end. The flow tube is preferably a chip-shaped container that includes a narrow tube, which includes the mouth part at a leading end and contains a chemical substance solution to be measured, and a wide tube that communicates with the narrow tube and includes the opening part for attachment. The flow tube has a shape and a size of a cross section through which the measurement light can pass. For example, an internal space of the flow tube has a cylindrical shape with a cross section thereof being circular, and an inner diameter thereof is, for example, 0.05 mm to 10 mm, is preferably 0.1 mm to 5 mm, and is more preferably around 0.5 mm to 1 mm. A size and shape of this cross section are set on the basis of a shape or a size of the emitting end and the light receiving end. With this arrangement, a length in an axis direction or a vertical direction with which length an optical length corresponding to a small amount (such as around 0.1 μL to 10 μL) of a chemical substance solution can be set is included. Also, there is a case where an internal space of a flow tube is truncated cone-shaped or prismatic. The "one of the emitting end and the light receiving end" is the nozzle or the suction/discharge mechanism such as a lower end of the nozzle, a lower end of a plunger that slides in a cylinder included in the suction/discharge mechanism provided on an upper side of the nozzle, or a recessed part, a protruded part, or the like provided in the nozzle, and is provided with emitting end surfaces or light receiving end surfaces facing a lower direction. Similarly, the "the other of the emitting end and the light receiving end" is "provided outside the flow tubes in such a manner that the mouth parts of the flow tubes can be placed on an upper side thereof." Thus, at least a position where the mouth parts of the flow tubes cannot be placed on an upper side thereof, such as "the nozzles and the suction/discharge mechanism" is excluded. The other is provided, for example, in a stage (described later) with emitting end surfaces or light receiving end surfaces facing an upper direction. Here, "the upper side of the other" includes a case where the mouth parts are in contact with or close to the upper side of the other of the emitting end and the light receiving end. A "prescribed amount" is a previously set amount and is set on the basis of a capacity of a reaction container or a liquid containing unit, a capacity, a shape (including tubular shape, shape including wide tube and narrow tube, cross section shape, and the like), a size (including cross section area, inner diameter, length in axis direction, and the like), or the like of a flow tube, a designated optical length, a kind (including mixture of a plurality of kinds), an amount, concentration, a mixing ratio (in a case of mixture of a plurality of kinds), a property, or the like of a chemical substance solution or a chemical substance, or designation or the like from a control unit.

In use, both of the emitting end and the light receiving end are preferably placed on a common vertical axis that passes through both of the mouth part and the opening part for attachment of the flow tube attached to the nozzles. Then, by providing one of the light receiving end and the emitting end on a common vertical axis of a flow tube of at least one of the nozzles or the suction/discharge mechanism and by providing the other on a stage, it is possible to easily and securely place the light receiving ends and the emitting ends on the common vertical axis by using a nozzle moving mechanism (described later). Thus, it becomes possible to easily and securely perform emission of measurement light in a direction of the common vertical axis of the flow tube. A "vertical direction" is a direction of a case where a flow tube is attached to a nozzle and preferably corresponds to a direction along a common vertical axis of the flow tube, or a suction/discharge direction of the flow tube.

More preferably, the "one of the emitting end and the light receiving end" provided in the nozzles or the suction/discharge mechanism is the emitting end, and the "other of the emitting end and the light receiving end" provided outside a flow tube in such a manner that a mouth part of the flow tube can be placed on an upper side thereof is the light receiving end. With this arrangement, measurement light emitted from the emitting ends is more securely emitted compared to a case of being emitted from a mouth part, and it is possible to make a total amount or a main part of the light pass through the flow tube. Specifically, in a case where a flow tube is formed in a taper manner, for example, in a manner of a chip-shaped container, a degree of this is high.

The emitting ends are optically connected to a light source, and the light receiving ends are optically connected to a photoelectric conversion unit that converts intensity of light into an electric signal. Here, for example, a deuterium lamp (such as L10671D, Hamamatsu Photonics K.K.) or a halogen lamp is used as a "light source," and a continuous wavelength from an ultraviolet light region to a visible region can be emitted to a sample. A "photoelectric conversion unit" is, for example, a photomultiplier tube (PMT) or a photoelectric element. These light source and emitting ends belong to an emission unit, and the light receiving ends and the photoelectric conversion unit belong to a light receiving unit. There is a case where the optical filter or the spectroscope is provided between the light receiving ends and the photoelectric conversion unit and light from the light receiving ends is guided to the photoelectric conversion unit through the filter or the spectroscope. Also, there is a case where the optical filter or the spectroscope is provided between the light source and the emitting ends and light from the light source is guided to the emitting ends through the optical filter or the spectroscope. Moreover, as the spectroscope used by being connected to the light receiving ends, a spectroscope that also includes a photoelectric conversion unit to measure spectroscopic absorption intensity and that can simultaneously measure spectroscopic absorption intensity of components of a plurality of wavelengths of light from the light receiving ends can be also used.

The one or more liquid containing units can contain one or more kinds of chemical substance solutions. In this case, absorbance of the one or more kinds of chemical substance solutions can be measured. In that case, there are a case where the one or more kinds of chemical substance solutions are independently and simultaneously measured in parallel and a case where two or more kinds of chemical substances are mixed and measured collectively. In a case where mixture and suction are performed, it is preferable that mixed liquid is sucked after being once created and contained in the liquid containing units. In a case where absorbance of each chemical substance solution is measured, there is a case where various kinds of measurement light appropriate to various kinds of chemical substance solutions are emitted.

A "control unit" includes a computer (CPU) included in the absorbance measuring device, a program that drives the computer, and the like, and includes, for example, a memory, a display device, and an input device such as a keyboard, a touch panel, or a mouse. The control unit performs control by exchanging a signal with the suction/discharge mechanism, a nozzle moving mechanism, a nozzle head, a light source photoelectric conversion unit, or the like (described later) through a DA converter and an AD converter.

By leading absorbance from intensity of transmitted light of a chemical substance solution to be measured, the control unit can acquire various physical amounts on the basis of the absorbance and can analyze the chemical substance solution. For example, to analyze concentration of various chemical substances (such as nucleic acid, lipid, protein, and carbohydrate), concentration of the solution is led from the absorbance on the basis of the Lambert-Beer law in a manner described in the following.

In a case where intensity of measurement light (wavelength $\lambda$) before becoming incident to a chemical substance solution in a flow tube is $I_0$, intensity of the transmitted light is I, a molar attenuation coefficient (determined according to wavelength $\lambda$ and chemical substance to be measured and standardized by unit molar concentration) is $\varepsilon$, molar concentration to be eventually calculated is c, and an optical length is L, $I=I_0 \cdot 10^{(-\varepsilon cL)}$. On the other hand, when the absorbance $A_\lambda$, that is, transmittance $I/I_0$ is calculated from a relationship of the absorbance $A_\lambda = -\log_{10}(I/I_0)$, molar concentration c of a nucleic acid or the like included in a solution can be calculated by the following relational expression.

$$A_\lambda = \varepsilon cL \quad (1)$$

Also, in a case where a chemical substance to be measured (sample) reacts to various enzymes (such as AST, ALT, lipase, LDH, and $\gamma$-GTP) and concentration thereof varies, it is possible to analyze enzymatic activity on the basis of absorbance lead from transmitted light of the chemical substance solution.

Since being expressed by a reaction rate, that is, a change rate of concentration of the chemical substance dc/dt (change rate of concentration: mol/L), enzymatic activity is expressed by an absorbance variation in unit time of the absorbance variation $(dA_\lambda/dt)$ on the basis of the expression (1) of the Lambert-Beer law. That is, $$dc/dt = (dA_\lambda/dt) \cdot (1/\varepsilon L) \quad (2)$$

is acquired. For example, $\varepsilon$ is 6300 L/(mol·cm) with respect to a nicotinamide adenine dinucleotide (NADH).

Then, the enzymatic activity is expressed in the following manner. That is, $$\text{enzymatic activity} = (dc/dt) \cdot (V_t/V_s) \quad (3)$$

$V_t$=full volume of the chemical substance solution (L)
$V_s$=sample volume (L)

Thus, by substituting the expression (3) in the expression (2), $$\text{enzymatic activity} = (dA_\lambda/dt) \cdot V_t/(\varepsilon L V_s) \quad (4)$$

is acquired.

However, in a unit of an enzyme, an amount of an enzyme that can convert 1 µmol of a substrate in 1 L of a sample in one minute under an optimal condition is defined as 1 Unit (U). Thus, a unit of enzymatic activity is expressed as 1 U/L and is expressed by the following expression acquired by modification of the above expression (4).

$$\text{enzymatic activity}(U/L) = \Delta A_\lambda \cdot (V_t \cdot 10^6)/(\varepsilon L V_s)$$

$\Delta A_\lambda$: absorbance variation in one minute
$V_t$: all reactant volume (mL)
$V_s$: sample volume (mL)
$\varepsilon$: mol absorbance (L/(mol·cm))
L: optical length (cm)

Moreover, the control unit measures concentration of an unknown chemical substance solution (sample) and absorbance of a substance of known concentration (standard solution) and creates a graph or a chart of a standard curve expressing a relationship between the concentration and the absorbance. It becomes possible to calculate, from absorbance of the unknown chemical substance solution, concentration thereof by using the standard curve or the chart.

Also, the control unit can perform immune antibody quantitative measurement (such as CPR, FDP, or D dimer). In measurement of hemoglobin or the like in a specimen, an antibody is fixed to a resin latex particle by utilization of antigen-antibody reaction, antigen-antibody reaction with an antigen in a sample is caused, and the latex particle is agglutinated. When this agglutination reaction is considered as an absorbance variation, a variation amount of the absorbance is increased depending on an antigen level in the sample. When a standard curve is created by utilization of this standard solution of known concentration, an antigen level in the specimen can be measured from a variation amount of the absorbance.

Note that the control unit can calculate absorbance of one or more kinds of chemical substances on the basis of intensity of one or more kinds of transmitted light and can calculate concentration or the like of the one or more kinds of chemical substances on the basis of the absorbance.

A second invention is the absorbance measuring device, wherein the liquid containing units, and the other of (the group of) the emitting end(s) and (the group of) the light receiving end(s) are provided in a stage, a nozzle moving mechanism that can relatively move the nozzles with respect to the stage is further included, and the control unit leads absorbance of the chemical substance solution by at least controlling the nozzle moving mechanism and the suction/discharge mechanism.

The suction/discharge mechanism and the nozzles are preferably provided in a nozzle head.

In this case, for example, with respect to the nozzle moving mechanism, there are a case where only a nozzle provided in a nozzle head fixed to a stage is moved, a case where a nozzle fixed to a nozzle head is moved along with the nozzle head, and a case where a nozzle is movably provided to a nozzle head and the nozzle head is movable. Also, since it is possible to "relatively move the nozzles with respect to the stage," in addition to a case where the nozzles are movable with respect to the fixed stage, there are a case where a stage is movable with respect to a fixed nozzle, and a case where both of a nozzle and a stage are movable.

It is preferable that a flow tube containing unit that contains a flow tube with an opening part for attachment being on an upper side in such a manner that attachment to a nozzle becomes possible by downward movement of the nozzle by the nozzle moving mechanism is provided in the stage. Also, a reaction container in which a temperature can be controlled is preferably provided in addition of a liquid containing unit. The control unit preferably controls the nozzle moving mechanism in such a manner that a flow tube is attached to a nozzle by relative downward movement of the nozzle. In this case, a detachment mechanism of the flow tube which mechanism detaches the flow tube from the nozzle by controlling the nozzle moving mechanism is preferably provided in the nozzle head. With this arrangement, attachment/detachment of a flow tube is performed without manpower. Thus, it is possible to prevent cross contamination and to use a flow tube corresponding to an amount of a liquid to be measured.

Note that one of an emitting end and a light receiving end is provided in a nozzle or a suction/discharge mechanism, that is, a nozzle head, and the other of the emitting end and the light receiving end is provided in a position, which is outside a flow tube and in which a mouth part of the flow tube can be placed on an upper side thereof, such as a stage. However, a whole emission unit or a whole light receiving unit is not necessarily provided in the same nozzle head or stage with the emitting end or the light receiving end.

A third invention is the absorbance measuring device further including an emission switching unit that switches optical connection between the one or more emitting ends and one or more light sources, or a light-reception switching unit that switches optical connection between the one or more light receiving ends and one or more photoelectric conversion units.

As the emission switching unit, there is a case where switching of a plurality of kinds of measurement light is performed between the emitting ends and a plurality of light sources. As the emission switching unit or the light-reception switching unit, there is what switches connection between a plurality of light receiving ends and/or emitting ends corresponding to a plurality of nozzles or flow tubes, and one photoelectric conversion unit and/or light source and enables emission and reception of light with respect to a plurality of pairs of emitting ends and light receiving ends by using one light source or one photoelectric conversion unit. Also, there is a combination of these. The emission switching unit and the light-reception switching unit are collectively referred to as a switching unit. Note that the light receiving ends or the emitting ends are preferably connected to the photoelectric conversion unit or the light source by a flexible light guiding path such as an optical fiber.

A fourth invention is the absorbance measuring device, wherein at least one of the liquid containing units and a reaction container is a photometric container including a bottom part in which a translucent region that is translucent to the measurement light is formed on the upper side of the other of the emitting end and the light receiving end.

The photometric container is preferably provided as a liquid containing unit or a reaction container in a stage such as a cartridge container. The bottom part is preferably formed in a shape to which a mouth part of a flow tube can be abutted. The "translucent region" is a whole of the bottom part or a part of the bottom part. Thus, the "translucent region" at least has a size or a shape to which a leading end surface of the mouth part can be abutted. Also, the translucent region is preferably provided in such a manner as to be appressed to or close to a light receiving end surface of a light receiving end without an air layer therebetween. With this arrangement, an optical length can be set from an upper end surface of liquid contained in a flow tube to a light receiving end without an air layer therebetween.

A fifth invention is the absorbance measuring device, wherein the flow tubes are formed in such a manner as to be shielded from outside light, the photometric container includes a tubular recessed part from an upper side of which a lower end part of each of the flow tubes can be inserted or loosely inserted and which is formed around a center of the bottom part of the photometric container, the translucent region is formed in a narrow bottom part of the recessed part, and a narrow sidewall part of the recessed part is formed in such a manner as to be shielded from the outside light.

Here, "outside light" is mainly visible light or ultraviolet light. Also, being "formed in such a manner as to be shielded from outside light" is, for example, to form the flow tubes or the sidewall part of the recessed part of a black substance as a light blocking member or of a translucent material to which a black paint is applied or which is covered thereby, or to provide the flow tubes or the recessed part in a manner of being surrounded by a different member having a light blocking effect. In a case where a black substance is included, a black pigment is kneaded into resin and molding is performed. With this arrangement, it is possible to block light in a whole optical path passing through a chemical substance solution to be measured, to prevent ingression of outside light into the optical path, and to perform measurement highly accurately. Note that the recessed part is formed in a narrow tube shape including an opening part having a cross section area adequately smaller than that of an opening part of the photometric container to which opening part a lower end part of a flow tube can be inserted or loosely inserted. Here, it is preferable that the narrow bottom part of the recessed part is optically connected to a light receiving end surface of a light receiving end in an appressed manner or closely without an air layer therebetween. With this arrangement, an optical length can be set from an upper end surface of liquid contained in a flow tube to a light receiving end without an air layer. "Around a center" is preferably the "center."

A sixth invention is the absorbance measuring device, wherein the control unit performs control in such a manner that the chemical substance solution is sucked to an upper side of a position that is above each of the mouth parts of the flow tubes for a certain distance.

Here, for example, in a flow tube having a length of 5 cm to 20 cm, the certain distance is, for example, 0.5 mm to 10 mm and is preferably 1 mm to 5 mm. A part of a chemical substance solution or mixed liquid is, for example, 1 mm to 15 mm.

With this arrangement, it is possible to prevent liquid leakage from a mouth part of a flow tube and, to stabilize an optical length, and to acquire highly reliable absorbance.

A seventh invention is the absorbance measuring device, wherein two or more kinds of chemical substance solutions are respectively contained in the two or more liquid containing units, one kind of chemical substance solution in plurality of kinds of the chemical substance solutions is an internal standard solution of known concentration, one kind of measurement light in the plurality of kinds of measurement light is standard measurement light that can be absorbed by the internal standard, and the control unit controls in such a manner that a prescribed amount of each of the chemical substance solutions and a prescribed amount of the internal standard solution are mixed and sucked in the flow tubes, each kind of the measurement light and the standard measurement light are emitted from the emitting ends into the flow tubes, and absorbance of each of the chemical substance solutions is led on the basis of intensity of each kind of transmitted light with respect to the measurement light and intensity of transmitted light with respect to the standard measurement light which pieces of transmitted light are received at the light receiving ends.

In a case where a nucleic acid solution is to be measured as a chemical substance solution, an "internal standard" preferably has low absorption of light around a concentration measurement region of a nucleic acid, that is, around 260 nm. For example, bromophenol blue (BPB, blue pigment) is used. By using an internal standard, it becomes possible to remove an influence, on measurement accuracy, of an exponential variation of transmittance by a variation in an optical length due to fluctuation of a volume of a solution along with introduction of the solution into a flow tube, and to measure absorbance highly reliably.

Here, the control unit of the absorbance measuring device that calculates absorbance of each of the chemical substance solutions from intensity of transmitted light of each kind of the measurement light, that calculates absorbance of the internal standard solution from intensity of transmitted light of the standard measurement light, and that calculates absorbance of each of the chemical substance solutions by using an attenuation coefficient of each of the chemical substance solutions, an attenuation coefficient of the internal standard solution, and concentration of the internal standard solution which concentration is calculated from an amount of mixed liquid.

Here, with respect to a certain chemical substance solution (A1), it is assumed that absorbance corresponding to measurement light having a wavelength appropriate to measurement thereof is $A_1$, an attenuation coefficient is $\varepsilon_1$, and concentration of the chemical substance is $c_1$. Also, with respect to an internal standard (A0), it is assumed that absorbance corresponding to standard measurement light having a wavelength appropriate to measurement thereof is $A_0$, an attenuation coefficient is $\varepsilon_0$, prescribed concentration of the internal standard is $c_0$. Also, when an optical length of a case where mixture and suction in a flow tube are performed is L (common as mixed liquid), the following expressions are acquired from the Lambert-Beer law.

$$A_1 = \varepsilon_1 c_1 L,$$

$$A_0 = \varepsilon_0 c_0 L$$

When an optical length is erased from these expressions, the concentration $c_1$ is calculated from $c_1 = (A_1 \varepsilon_0 c_0)/(A_0 \varepsilon_1)$, and highly reliable concentration based on a relative ratio with the internal standard can be acquired without being influenced by a variable optical length.

An eighth invention is the absorbance measuring device, wherein two or more kinds of chemical substance solutions are respectively contained in the two or more liquid containing units, one kind of chemical substance solution in plurality of kinds of the chemical substance solutions is a diluent, and the control unit controls in such a manner that a prescribed amount of each of the chemical substance solutions and a predetermined amount of the diluent are mixed and sucked in the flow tubes, each kind of the measurement light from the emitting ends is emitted into the flow tubes, and absorbance of the chemical substance solutions is led on the basis of intensity of each kind of transmitted light with respect to the measurement light which transmitted light is received at the light receiving ends.

A ninth invention is an absorbance measuring method including: a sucking step of sucking, by using a suction/discharge mechanism, a prescribed amount of a chemical substance solution from one or more liquid containing units, which contain a chemical substance solution, into one or more flow tubes each of which is detachably attached at an upper end to one or more nozzles and each of which includes at a lower end a mouth part that can be inserted into the liquid containing unit; a step of providing one or more emitting ends that can emit measurement light and one or more light receiving ends that can receive the light emitted from the emitting ends, wherein one of (a group of) the emitting end(s) and (a group of) the light receiving end(s) is provided in the nozzles or the suction/discharge mechanism, (respectively), and the other of (the group of) the emitting end(s) and (the group of) the light receiving end(s) is provided outside the flow tubes in such a manner that mouth parts of the flow tubes can be placed on an upper side thereof, (respectively), placing the mouth parts of the flow tubes attached to the nozzles on the upper side of the other of (the group of) the emitting end(s) and (the group of) the light receiving end(s), and emitting the measurement light from the emitting ends in a vertical direction through the flow tubes; and an absorbance analyzing step of leading absorbance of the chemical substance solution on the basis of intensity of transmitted light received at the light receiving ends.

Here, the sucking step preferably includes an attaching step of containing the one or more flow tubes in a flow tube containing unit in a manner attachable to the nozzles, and detachably attaching the one or more nozzles to the one or more flow tubes by relative downward movement thereof by the nozzle moving mechanism. The liquid containing units and the flow tube containing unit are preferably provided in a stage. Each of the flow tubes has at an upper end an opening part for attachment that can be detachably attached to the nozzles and at a lower end a mouth part that can be inserted into the containing units, and is contained in the flow tube containing unit with the opening part for attachment on an upper side.

In the measurement light emitting step, it is preferable that by the nozzle moving mechanism one of the emitting end and the light receiving end is provided on a common vertical axis passing through both of the mouth part and the opening part for attachment of the one or more flow tubes and in the nozzles or the suction/discharge mechanism, and the other of the emitting end and the light receiving end is placed on the common vertical axis. Also, in a case where the one or more kinds of chemical substance solutions are contained in the one or more liquid containing units and the chemical substance solutions are measured, there is a case where one or more kinds of measurement light that can be absorbed by chemical substances of the chemical substance solutions are preferably emitted from the emitting ends. In a light receiving step, received light is further converted into an electric signal by the photoelectric conversion unit. In the absorbance analyzing step, it is possible to lead absorbance, and to calculate concentration, enzymatic activity, an immunizing antigen level, and the like of the chemical substance solutions on the basis of the lead absorbance.

A tenth invention is the absorbance measuring method, wherein the liquid containing units, and the other of (the group of) the emitting end(s) and (the group of) the light receiving end(s) is provided in a stage, and a nozzle moving mechanism that can relatively move the nozzles with respect to the stage is included, and, in the measurement light emitting step, the mouth parts of the one or more flow tubes are placed on the upper side of the other of (the group of) the emitting end(s) and (the group of) the light receiving end(s) by the nozzle moving mechanism and emission is performed in the vertical direction through the flow tubes.

The suction/discharge mechanism and the nozzles are preferably provided in a nozzle head.

An eleventh invention is the absorbance measuring method, wherein the measurement light emitting step includes an optical connection switching step of switching optical connection between the one or more emitting ends and one or more light sources or between the one or more light receiving ends and one or more photoelectric conversion units.

An twelfth invention is the absorbance measuring method, wherein in the sucking step, at least one of the liquid containing units and a reaction container is a photometric container that includes a bottom part which is formed on the upper side of the other of (the group of) the emitting end(s) and (the group of) the light receiving end(s) and in which a translucent region with translucency is formed, and suction into the flow tubes is performed by the suction/discharge mechanism with only a part of a chemical substance solution contained in the photometric container being left, and in the measurement light emitting step, the mouth parts of the flow tubes are placed on the upper side of the other of (the group of) the emitting end(s) and (the group of) the light receiving end(s) by abutment of the mouth parts of the flow tubes to the translucent region in the bottom part, and the measurement light is emitted from the emitting ends in the vertical direction through the flow tubes.

With this arrangement, since a part of a chemical substance solution is left in the container, it becomes possible to prevent introduction of an air layer into the flow tubes, to form an optical path from the mouth parts only with respect to a chemical substance solution to be measured, and to perform highly accurate measurement.

Note that in a case where a recessed part is provided in the bottom part of the photometric container, it is possible to perform positioning by loosely inserting or inserting a lower end part of one of the flow tubes into a narrow bottom part of the recessed part. The translucent region is preferably provided in such a manner as to be appressed to or close to a light receiving end surface of each of the light receiving ends without an air layer therebetween.

A thirteenth invention is the absorbance measuring method, wherein the flow tubes are provided in such a manner as to block outside light, the photometric container includes a tubular recessed part from an upper side of which a lower end part of each of the flow tubes can be inserted or loosely inserted and which is formed around a center of the photometric container, the translucent region is provided in a narrow bottom part of the recessed part, and a narrow sidewall part of the recessed part is provided in such a manner as to be shielded from the outside light, and in the measurement light emitting step, the flow tubes are moved to an upper side of the photometric container, and the measurement light is emitted from the emitting ends in the vertical direction through the flow tubes in a state in which the lower end part of each of the flow tubes is inserted or loosely inserted into the recessed part and the mouth part thereof is abutted to the narrow bottom part.

A fourteenth invention is the absorbance measuring method, wherein in the sucking step, the chemical substance solution is sucked to an upper side of a position that is above the mouth parts of the flow tubes for a certain distance.

A fifteenth invention is the absorbance measuring method, wherein the chemical substance solution in the sucking step is a plurality of kinds of chemical substance solutions, one kind of chemical substance solution in the chemical substance solutions is an internal standard solution of known concentration, and a prescribed amount of each of the chemical substance solutions and a prescribed amount of the internal standard are mixed and sucked into the flow tubes, there are a plurality of kinds of the measurement light in the measurement light emitting step, one kind of measurement light among these is standard measurement light that can be absorbed by the internal standard, and each kind of the measurement light and the standard measurement light are emitted into the flow tubes, the light receiving step is performed by reception of transmitted light with respect to each kind of the measurement light and transmitted light with respect to the standard measurement light at the light receiving ends, and in the analyzing step, absorbance of each of the chemical substance solutions is led on the basis of intensity of the transmitted light of each kind of the measurement light and intensity of the transmitted light of the standard measurement light.

Note that in the absorbance analyzing step, absorbance of each of the chemical substance solutions is calculated from intensity of the transmitted light of each kind of the measurement light, and calculates absorbance of the internal standard solution from intensity of the transmitted light of the standard measurement light. Moreover, for example, concentration of each of the chemical substance solutions is calculated by utilization of concentration of the internal standard solution which concentration is calculated from an attenuation coefficient of each of the chemical substance solutions, an attenuation coefficient of the internal standard solution, and an amount of mixed liquid.

A sixteenth invention is the absorbance measuring method, wherein one kind of chemical substance solution in the plurality of kinds of chemical substance solutions in the sucking step is a diluent, and a prescribed amount of each of the chemical substance solutions and a predetermined amount of the diluent are mixed and sucked into the flow tubes.

Advantageous Effects of Invention

According to the first invention or the ninth invention, a chemical substance solution is held or contained in a flow tube in a narrow columnar shape having a cross section in a degree in which passage of measurement light is possible, an amount of liquid necessary for measurement is controlled, and measurement of absorbance with respect to a small volume of liquid is made possible. Also, since measurement light is not blocked by a flow tube that contains a chemical substance solution, it is possible to remove or reduce an optical influence on the measurement light and to acquire highly accurate absorbance. Also, since measurement light is not blocked by the flow tube, it is possible to perform production inexpensively without using a flow tube produced with a special material corresponding to a kind of measurement light, to prevent ingression of light from the outside by using a member opaque to measurement light (such as black substance) for a flow tube, and to perform highly accurate measurement of concentration. Here, a "narrow columnar shape" means being formed in a manner narrower than a cross section of a nozzle and is formed by containing and holding of liquid in the flow tube.

It is possible to set an appropriate optical length corresponding to an amount of liquid sucked in a range of a length of the flow tube in a vertical direction, and to emit and receive measurement light without making an emitting end and a light receiving end come into contact with a solution. Thus, reliability is high since cross contamination due to contact between a light receiving end and an emitting end and a solution is prevented, and general versatility is high since an optical length is not fixed by a size of a container, an appropriate optical length corresponding to a liquid amount can be set, and absorbance corresponding to various amounts of liquid can be measured.

Moreover, it becomes possible to accurately determine and stabilize an optical length and to perform measurement highly reliably by using a suction/discharge mechanism with high quantitative capability and a control unit.

Also, when a plurality of nozzles is used, absorbance of a plurality of chemical substance solutions can be measured in parallel and efficiency is high.

Also, since an emitting end or a light receiving end is provided to a nozzle or a suction/discharge mechanism without a change in a basic form and a basic function thereof, without providing a special nozzle or suction/discharge mechanism, or a special component for photometric processing separately from dispensing processing, by using a common nozzle and suction/discharge mechanism with usual dispensing processing without interrupting a suction/discharge function, it is possible to perform usual dispensing processing and photometric processing by attachment of a flow tube to the nozzle. Thus, processing is easy and operation efficiency is high.

According to the second invention or the tenth invention, since being relatively movable with respect to a stage in which a liquid containing unit, an emitting end, or a light receiving end is provided, a flow tube can be moved to a container that contains a chemical substance solution to be measured, can perform sucking thereof, can be moved to a light measuring position where the emitting end or the light receiving end is provided, and can be easily and securely placed in an accurate position. Also, it becomes possible to emit measurement light in a vertical direction and to measure absorbance without a touch by a human. Thus, it is possible to prevent cross contamination and to perform highly reliable measurement. Moreover, it is possible to execute attachment of a flow tube to a nozzle without a touch by a human by providing a flow tube containing unit, which contains the flow tube, in a stage. Also, it is possible to consistently perform extraction of a nucleic acid or the like from a sample, creation of a nucleic acid solution as a chemical substance solution, and PCR processing.

According to the third invention or the eleventh invention, by switching optical connection between one or more emitting ends and one or more light sources, it is possible to emit various kinds of measurement light from the emitting ends. Thus, it is possible to perform processing with high general versatility. Also, since it is possible to supply measurement light to a plurality of emitting ends by using one light source, it is possible to prevent an increase in a device scale. Moreover, since it is possible to receive measurement light having various wavelengths by performing switching between a light receiving end and a photoelectric conversion unit corresponding to the various wavelengths, general versatility is high. Also, since it is possible to perform photoelectric conversion of a plurality of light receiving ends by using one photoelectric conversion unit, it is possible to prevent an increase in a device scale or an increase in a cost.

According to the fourth invention or the twelfth invention, a mouth part of a flow tube is abutted to a translucent region of a bottom part of a photometric container in a state in which a chemical substance solution to be a liquid-containing measurement object in a photometric container that contains a chemical substance solution is sucked into the flow tube with only a part thereof being left, whereby it is possible to prevent a variation of a lower end of an optical length of liquid due to liquid leakage from the mouth part, movement of the liquid through the mouth part, or mixture of an air layer around the mouth part. Thus, it is possible to stabilize an optical length of a flow tube and to realize highly accurate measurement of absorbance. Also, even in a case where a prescribed amount of liquid to be measured is small, it is possible to set an appropriate optical length and to perform measurement by sucking a prescribed amount of liquid into the flow tube. Specifically, in a case where a translucent region is close to or appressed to a light receiving end surface, an air layer is not mixed from an upper end surface to a light receiving end surface of liquid. Thus, an optical length is stable.

According to the fifth invention or the thirteenth invention, not only a flow tube but also a narrow sidewall part of a recessed part is provided in such a manner as to be shielded from outside light, whereby it is possible to put a whole optical length in a state of being shielded from the outside light. Thus, a light receiving end can receive transmitted light only by measurement light and can perform highly accurate measurement of absorbance.

According to the sixth invention or the fourteenth invention, since the chemical substance solution is sucked to an upper side of a position that above the mouth part of the flow tube for a certain distance, it is possible to prevent liquid leakage from a mouth part at a lower end of the flow tube, to stabilize an optical length, and to acquire highly accurate absorbance. Also, since an optical path in a flow tube along a common vertical axis connecting an emitting end and a light receiving end is not blocked by a substance other than a chemical substance solution and the air, in which a wall part of the flow tube is included, it is not necessary to form a flow tube and a container with a substance transparent to measurement light, and it is possible to perform highly accurate measurement of absorbance inexpensively.

According to the seventh invention or the fifteenth invention, by mixing a chemical substance solution to be a measurement object of absorbance and an internal standard and calculating relative absorbance with the internal standard, it is possible to calculate highly reliable absorbance that is not influenced by a variation of the optical length.

According to the eighth invention or the sixteenth invention, since a diluent or a solvent is used as one of a plurality of kinds of chemical substance solutions, it becomes possible to measure absorbance of a diluted chemical substance solution.

DESCRIPTION OF EMBODIMENTS

Figure 1:
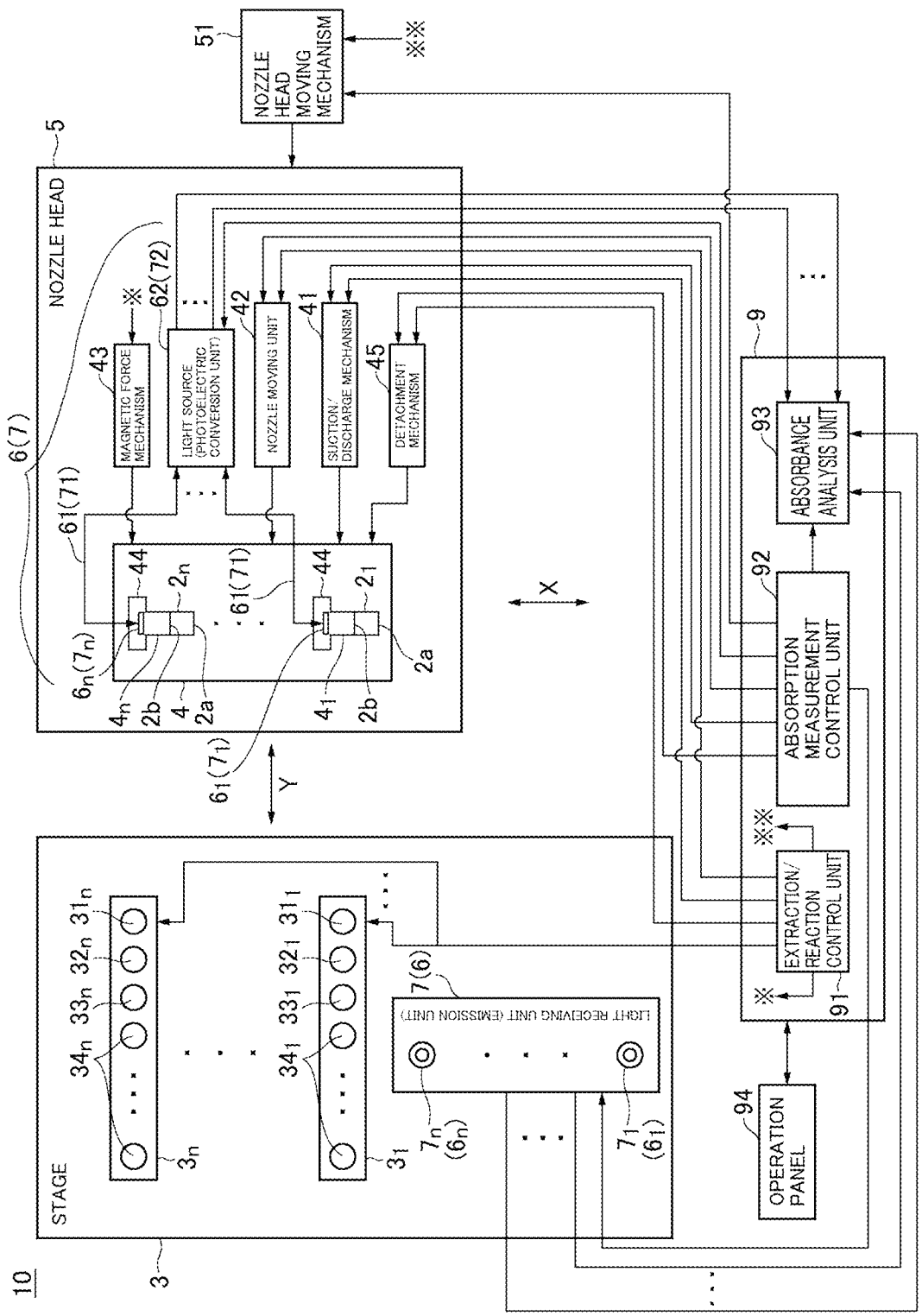
FIG. 1 is a block diagram of an absorbance measuring device according to an embodiment of the present invention.

An absorbance measuring device 10 according to an embodiment of the present invention is described on the basis of FIG. 1.

The absorbance measuring device 10 includes a stage 3 in which containing unit groups $3_1$ to $3_n$, in each of which one or more containing units that contain one or more kinds of chemical substance solutions, and a reaction container are arrayed in such a manner as to be extended in a Y-axis direction (column direction) are arrayed in an X-axis direction (row direction), and a nozzle head 5 including a suction/discharge mechanism 41 that sucks/discharges gas, a plurality of nozzles $4_1$ to $4_n$ that communicates with the suction/discharge mechanism 41 and that is arrayed in the X-axis direction at intervals corresponding to the array of the containing unit groups, and one or more flow tubes $2_1$ to $2_n$ each of which includes at a lower end a mouth part $2a$, which can suck/discharge liquid and which can be simultaneously inserted into each of the containing units or the reaction container in each of the containing unit groups, and includes at an upper end an opening part for attachment $2b$ detachably attached to the nozzles $4_1$ to $4_n$.

The absorbance measuring device 10 includes a nozzle moving mechanism (51, 42) that can relatively move the nozzles $4_1$ to $4_n$ with respect to the stage 3, one or more emitting ends $6_1$ to $6_n$ that can emit one or more kinds of measurement light to at least one of the flow tubes $2_1$ to $2_n$ in such a manner as to pass through the flow tubes $2_1$ to $2_n$, a light source 62 that is optically connected to the emitting ends, one or more light receiving ends $7_1$ to $7_n$ that can receive the light from the emitting ends $6_1$ to $6_n$, and a photoelectric conversion unit 72 that is optically connected to the light receiving ends $7_1$ to $7_n$ and that converts intensity of received light into an electric signal.

One of a group of the emitting ends $6_1$ to $6_n$ and a group of the light receiving ends $7_1$ to $7_n$ is provided on a common vertical axis passing through both of the mouth part $2a$ and the opening part for attachment $2b$ of each of the flow tubes $2_1$ to $2_n$ attached to the nozzles and is provided in the nozzles or the suction/discharge mechanism on an upper side thereof, respectively. The other of the group of the emitting ends $6_1$ to $6_n$ and the group of the light receiving ends $7_1$ to $7_n$ is provided in the stage 3 in such a manner that the mouth parts $2a$ of the flow tubes $2_1$ to $2_n$ can be placed on an upper side thereof, respectively.

The absorbance measuring device 10 includes a CPU+memory+program 9 that performs information processing as a control unit that controls the nozzle moving mechanism (51, 42), the suction/discharge mechanism 41, the light source 62, and the like and that calculates one or more kinds of chemical substance concentration, and an operation panel 94 on which operation such as an instruction by a user with respect to the CPU+memory+program 9 is performed.

The CPU+memory+program 9 performs control of sucking a prescribed amount of each of the chemical substance solutions independently or in a mixed manner into the flow tubes $2_1$ to $2_n$, placing the mouth parts $2a$ on the common vertical axis and on an upper side of the other of the group of the emitting ends $6_1$ to $6_n$ and the group of the light receiving ends $7_1$ to $7_n$, and calculating the absorbance on the basis of intensity of transmitted light acquired by emission of the measurement light into the flow tubes.

As described above, one of a column of the emitting ends $6_1$ to $6_n$ that can emit the measurement light through the flow tubes and a column of the light receiving ends $7_1$ to $7_n$ that can receive the light from the emitting ends is provided in a part 44 on the common vertical axis in the suction/discharge mechanism 41 or the nozzles $4_1$ to $4_n$ in the nozzle head 5 (such as leading end of nozzle $4_1$ to $4_n$ or leading end of plunger of cylinder), and the other is provided in the stage 3 in a manner of being arrayed in the X-axis direction. In light measurement, control is performed in such a manner that pairs of the light receiving ends $7_1$ to $7_n$ and the emitting ends $6_1$ to $6_n$ (pair of same subscript number) are placed on the common vertical axis through the flow tubes $2_1$ to $2_n$ attached to the nozzles $4_1$ to $4_n$. Each of the light receiving ends $7_1$ to $7_n$ or the emitting ends $6_1$ to $6_n$ provided in the part 44 on the common vertical axis in the nozzles $4_1$ to $4_n$ or the suction/discharge mechanism 41 is optically connected to the photoelectric conversion unit 72 or the light source 62 by a flexible light guiding path 71 (61). Here, the light source 62, the emitting ends $6_1$ to $6_n$, and the light guiding path 61 correspond to an emission unit 6, and the photoelectric conversion unit 72 and the light receiving ends $7_1$ to $7_n$ correspond to a light receiving unit 7.

In the nozzle head 5, a nozzle moving unit 42 that moves the nozzles $4_1$ to $4_n$ simultaneously in a Z-axis direction, a magnetic force mechanism 43 that can apply magnetic force to the inside of the flow tubes $2_1$ to $2_n$ attached to the nozzles $4_1$ to $4_n$, and a detachment mechanism 45 that can simultaneously detach the flow tubes $2_1$ to $2_n$ from the nozzles $4_1$ to $4_n$ are further provided. Here, a combination of the nozzle moving unit 42 that can move the nozzles $4_1$ to $4_n$ in the Z-axis direction and the nozzle head moving mechanism 51 that can move the nozzle head 5 in the Y-axis direction and the X-axis direction corresponds to the nozzle moving mechanism (51, 42).

A CPU+memory+program 9 includes an extraction/reaction control unit 91 that gives an instruction of extraction or reaction to the nozzle moving mechanism (51, 42), the suction/discharge mechanism 41, and the magnetic force mechanism 43, an absorption measurement control unit 92 that performs control of absorption measurement with respect to the nozzle moving mechanism (51, 42), the suction/discharge mechanism 41, the nozzle moving unit 42, the light source 62, and the photoelectric conversion unit 72, and an absorbance analysis unit 93 that leads absorbance of a chemical substance solution to be measured on the basis of intensity of transmitted light which intensity is acquired from the photoelectric conversion unit 72.

The containing unit groups $3_1$ to $3_n$ in the stage 3 respectively include one or more liquid containing units $34_1$ to $34_n$ containing one or more kinds of chemical substance solutions, dispensing flow tube containing units $32_1$ to $32_n$ in each of which a dispensing flow tube used as a dispensing chip is contained with an opening part for attachment being on an upper side in such a manner that attachment to the nozzles become possible, photometric flow tube containing units $33_1$ to $33_n$ in each of which a photometric flow tube that performs measurement of light absorption is contained with an opening part for attachment being on an upper side in such a manner that attachment to the nozzles becomes possible, and reaction containers $31_1$ to $31_n$ in which temperature control is possible.

Next, on the basis of FIG. 2 to FIG. 4, an absorbance measuring device 11 that is a more-detailed absorbance measuring device 10 that is according to the first embodiment of the present invention and that is described on the basis of FIG. 1 will be described.

Figure 2:
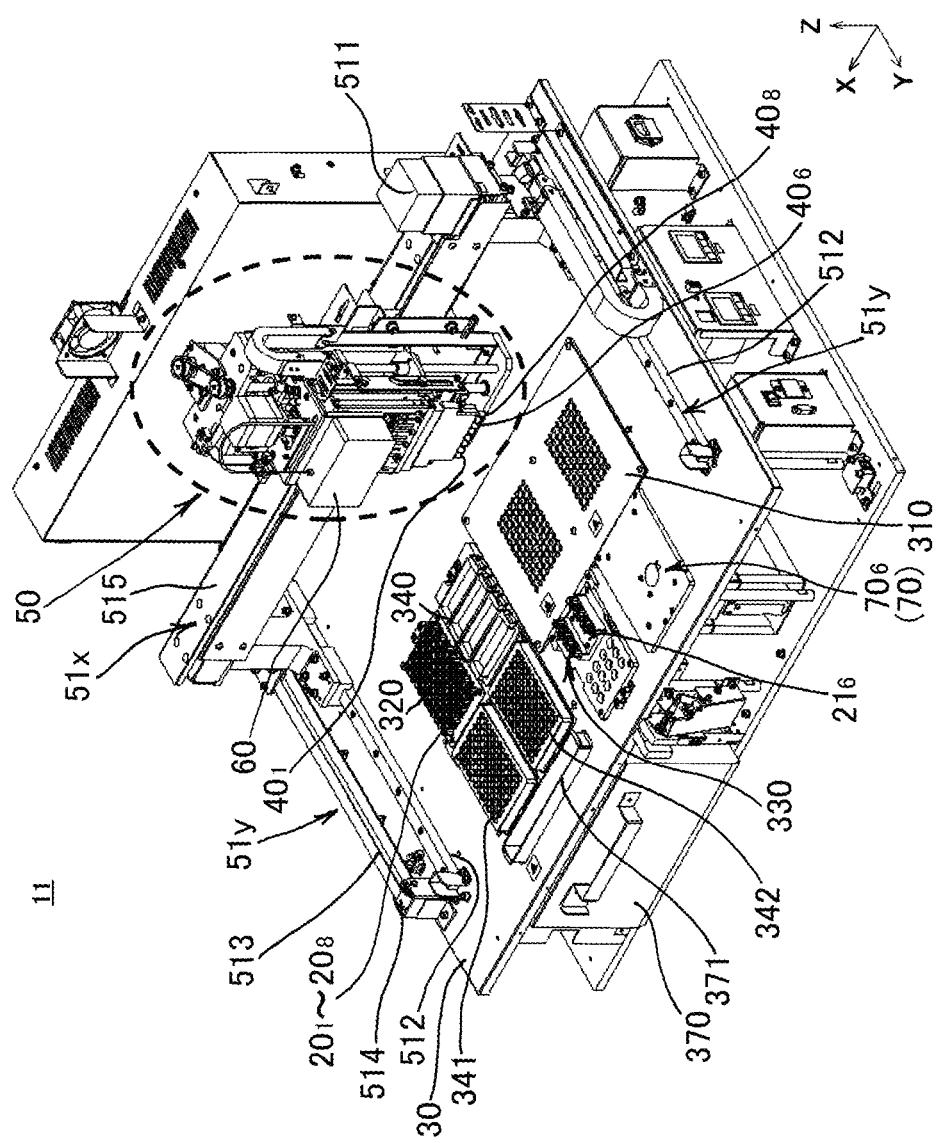
FIG. 2 is a perspective view of an absorbance measuring device according to a first embodiment of the present invention.

As illustrated in FIG. 2, the absorbance measuring device 11 is embedded in a chassis having a function of a dark box that can block intrusion of light from the outside when necessary, and a touch-type tablet (not illustrated) corresponding to the operation panel 94 is provided outside the chassis.

As illustrated in FIG. 2, the stage 30 formed of a plate includes microplates 310, 341, and 342 in which a plurality of 8 columns×12 rows (column direction is in Y-axis direction and row direction is in X-axis direction, same shall be applied hereinafter) of wells that can contain liquid is provided, four reagent tanks 340, a dispensing flow tube containing unit group 320 in which flow tube containing units that contain 8 columns×12 rows of dispensing flow tubes with mouth parts thereof being on a lower side and opening parts for attachment thereof being on an upper side are provided, a disposal vent 371 which has a length, with which flow tubes $20_1$ to $20_n$, and $21_1$ to $21_n$ attached to the plurality of (eight in this example) nozzles $40_1$ to $40_n$ (n=8 in this example) can be simultaneously inserted thereto, and through which the flow tubes detached from the nozzles $40_1$ to $40_n$ or liquid sucked by the flow tubes can be disposed to a disposal box 370 (described later), a photometric flow tube containing unit group 330 that contains 2 columns×4 rows of photometric flow tubes with mouth parts thereof on a lower side and opening parts for attachment thereof on an upper side, and a light receiving end $70_6$ (light receiving unit 70). Each well in the microplate 310 is a reaction container in which temperature control can be performed, a chemical substance solution to be a measurement object of concentration is contained in the microplate 341, and the microplate 342 is a well for mixing solutions. These microplates 310, 341, and 342, photometric flow tube containing unit 330, and the like are provided in a manner of being loadable to and removable from the absorbance measuring device 11. In the drawing, a sign 370 is a disposal box that can store liquid or a flow tube disposed to the disposal vent 371 and that is provided in a manner of being loadable to and removable from the absorbance measuring device 11.

Moreover, the absorbance measuring device 11 includes a nozzle head 50 in which a plurality of (eight in this example) nozzles $40_1$ to $40_n$ is arrayed in the X-axis direction, and a nozzle head moving mechanism 510 that can relatively move the nozzle head 50 in the Y-axis direction and the X-axis direction with respect to the stage 30. The nozzle head 50 includes a suction/discharge mechanism 410 that sucks/discharges gas, the eight nozzles $40_1$ to $40_n$ that communicate with the suction/discharge mechanism 410, sixteen flow tubes $20_1$ to $20_n$, and $21_1$ to $21_n$ including, at lower ends, mouth parts 20a and 21a that can suck/discharge liquid and that can be inserted into the containing units and including, at upper ends, opening parts for attachment 20b and 21b which parts can be detachably attached to the nozzles $40_1$ to $40_n$, a nozzle moving unit 420 that can move the nozzles $40_1$ to $40_n$ simultaneously in the Z-axis direction with respect to the stage 30, a magnetic force mechanism 430 which can simultaneously apply or remove magnetic force to or from the inside of the flow tubes $20_1$ to $20_n$ attached to the nozzles $40_1$ to $40_n$ and in which a magnet is provided in a manner of being retractable with respect to the flow tubes $20_1$ to $20_n$, a detachment mechanism 450 that can detach the flow tubes $20_1$ to $20_n$, and $21_1$ to $21_n$ attached to the nozzles $40_1$ to $40_n$ from the nozzles, and the light source 62. A combination of the nozzle head moving mechanism 510 and the nozzle moving unit 420 corresponds to the nozzle moving mechanism.

The nozzle head moving mechanism 510 includes a Y-axis moving mechanism $51y$ including a rail 512 laid in the Y-axis direction on the stage 30, a timing belt 513 bridged to a rotor 514 in the Y-axis direction, and a nozzle head supporting Y-axis moving body 515 that can be moved in the Y-axis direction by the timing belt 513, and an X-axis moving mechanism $51x$ provided in such a manner as to be able to move the nozzle head 50 in the X-axis direction to the nozzle head supporting Y-axis moving body 515. In the drawing, a sign 511 is a motor that drives a timing belt as the X-axis moving mechanism $51x$. Note that an information processing device corresponding to the CPU+memory+program 9 is also embedded in a downside of the stage 30.

Figure 3:
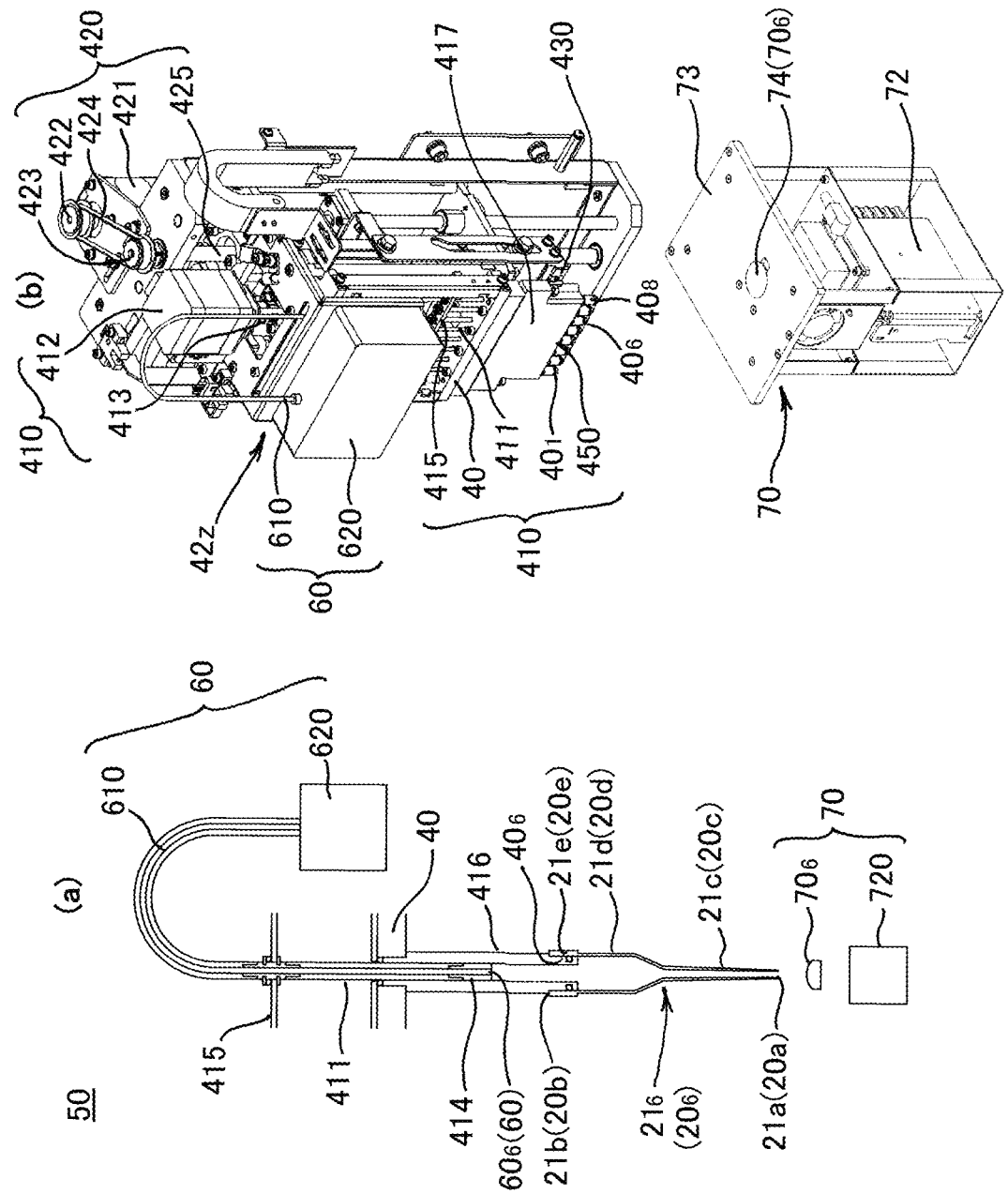
FIG. 3 is a cross sectional view conceptually illustrating a main part of FIG. 2 and a partially-enlarged perspective view in which a part of FIG. 2 is extracted and illustrated in an enlarged manner.
Figure 4:
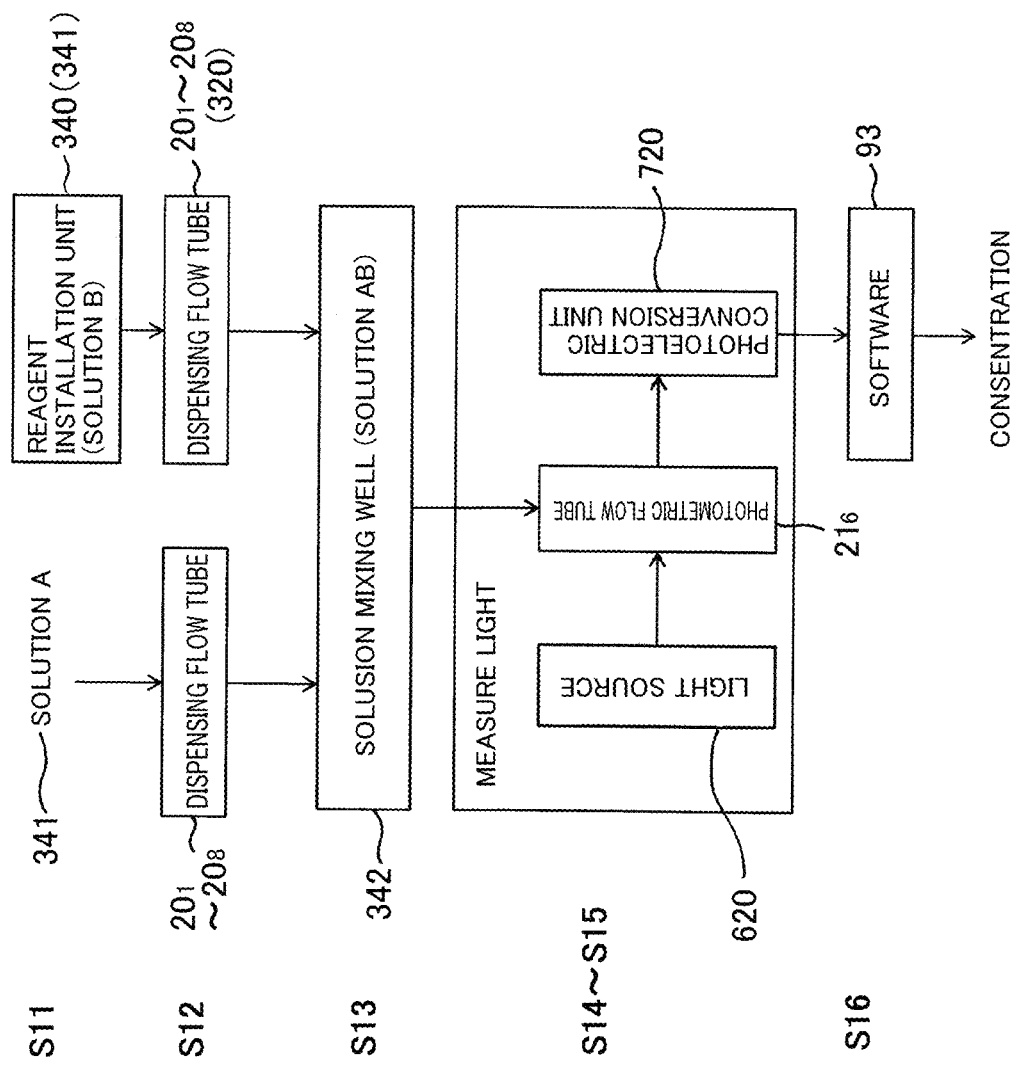
FIG. 4 is a flowchart of processing according to the first embodiment of the present invention.

In FIG. 3, the nozzle head 50 is illustrated in more detail. The nozzle head 50 includes a nozzle moving unit 420 that can move the plurality of nozzles $40_1$ to $40_n$ (n=8 in this example) in the Z-axis direction. The nozzle moving unit 420 includes a motor 421, a rotor 422 rotationally driven by the motor 421, a timing belt 424 bridged between the rotor 422 and a rotor 423, and a ball screw 425 that is laid in the Z-axis direction and is rotationally driven by the rotor 423. By a rotation of the ball screw 425, a Z-axis moving body $42z$ including a nozzle supporting substrate 40 that supports the nozzles coupled to a nut part screwed to the ball screw 425 is moved upward/downward.

As illustrated in FIG. 3, the Z-axis moving body $42z$ of the nozzle head 50 further includes a suction/discharge mechanism 410, and the suction/discharge mechanism 410 includes a motor 412, a ball screw 413 rotationally driven by the motor 412, a plunger driving plate 415 coupled to a nut part screwed to the ball screw 413, and a plurality of (eight in this example) plungers 411 that is coupled to the plunger driving plate 415 and that is provided in a manner of being slidable in a plurality of (eight in this example) cylinders 416. An optical fiber 610 as a flexible light guiding path is provided in a piercing manner in a plunger 411 that slides in one cylinder 416 that communicates with at least one nozzle such as a nozzle $40_6$ in the eight nozzles. A leading end of the optical fiber 610 is provided to an emitting end $60_6$ at a leading end part 414 of the plunger 411 and a rear end thereof reaches a light source 620. Here, the emitting end $60_6$, the optical fiber 610, and the light source 620 correspond to an emission unit 60.

As illustrated in FIG. 3(a), a lower end part of the cylinder 416 communicates with the nozzle $40_6$, and a photometric flow tube $21_6$ is detachably attached to the nozzle $40_6$. The photometric flow tube $21_6$ or a dispensing flow tube $20_6$ includes a mouth part 20a that is provided at a lower end and that can suck/discharge liquid, an opening part for attachment 20b, 21b that can be attached to the nozzle $40_6$, a narrow tube part 21c (20c) including the mouth part at a lower end, and a wide tube part 21d (20d) that is formed to be wider than the narrow tube part and that includes the opening part for attachment 20b, 21b at an upper end. A sign 21e (20e) is a protrusion that is protruded from the wide tube part 21d (20d) in an outer direction and that is provided in a manner of being detachable from the nozzle by a flow tube detachment plate 450 (described later). In a case of the photometric flow tube $21_6$, the narrow tube part and the wide tube part are preferably painted with a black paint or formed of a black substance. In a case of the dispensing flow tubes $20_1$ to $20_n$ (n=8 in this example), being transparent or translucent is preferable.

As illustrated in FIG. 3(b), a through hole having a size with which the eight nozzles $40_1$ to $40_n$ provided in such a manner as to be protruded to a lower end of the cylinder supported by the nozzle supporting substrate 40 can pierce through and a size in which the flow tubes $20_1$ to $20_n$, and $21_1$ to $21_n$ (n=8 in this example) attached to the nozzles $40_1$ to $40_n$ cannot piece through is formed in the flow tube detachment plate 450 of a bottom plate. A cylinder containing box 417 that is supported by the plunger driving plate 415 and that is provided in such a manner as to be able to move the flow tube detachment plate 450 in a lower direction by pushing a detaching stick by downward movement of the plunger driving plate 415 for a predetermined distance or more are included. A lower end of the detaching stick is attached to the flow tube detachment plate 450. The flow tube detachment plate 450 is supported in a state of being elastically biased to an upper side at all times. An upper end of the detaching stick is at a position separated from the plunger driving plate 415 for the predetermined distance.

As illustrated in FIG. 3(b), a light receiving unit 70 is provided in the stage 30. The light receiving unit 70 includes a hole 74 provided in a stage substrate 73, a lens of a light receiving end $70_6$ provided on a downside of the hole 74, and a photoelectric conversion unit 720 that includes an ADP as a light receiving element provided on a lower side of the lens, a CCD image sensor, a photomultiplier tube (PMT), and the like. Note that as described above, the light source 620 is provided in the nozzle head 50, and the light source 620 is optically connected, via the optical fiber 610, to the emitting end $60_6$ at the leading end part 414 of the plunger 411 that slides in the cylinder 416. For example, a deuterium lamp is used as the light source 620.

Next, an operation of the absorbance measuring device 11 according to the first embodiment of the present invention will be described.

In step S1, for example, 0.022 μM of a chemical substance solution A to be measured (such as dNTP mixture, Takara Bio Inc., Code: 4030, Lot: BH7301B) is previously contained in one well (for example, in sixth column in first row) of the microplate 341 provided on the stage 30 of the absorbance measuring device 11, and a reference solution C (such as TE, 10 mM Tris-HCl, 1 mM EDTA, pH 8.0) as a blank sample for reference measurement in which light is not absorbed is contained in one reagent tank (such as first tank in four tank) among the reagent tanks 340. Also, it is assumed that a dispensing flow tube $20_6$ is contained in one flow tube containing unit in the sixth column in the first row of the dispensing flow tube containing unit group 320 and that a dispensing flow tube $20_6$ is also contained in one flow tube containing unit in the sixth column in the second row. Note that a description of processing using a dispensing flow tube is omitted.

In step S2, the nozzle head 50 is moved to an upper side of the second column in the first row of the photometric flow tube containing unit group 330 by the nozzle head moving mechanisms $51x$ and $51y$ and the nozzle $40_6$ is moved downward by the nozzle moving unit 420, whereby a photometric flow tube $21_6$ (for example, formed by molding of olefin-based resin such as polypropylene or polyethylene to which resin pigment such as carbon black is kneaded) is attached to the nozzle $40_6$. After the attached flow tube $21_6$ is lifted by the nozzle moving unit 420, the photometric flow tube $21_6$ is placed above the first reagent tank in the four reagent tanks 340 by the nozzle head moving mechanisms $51x$ and $51y$ and is moved downward by the nozzle moving unit 420, around 10 mm (around 7.6 μL) of a prescribed amount of the reference solution C is sucked from a leading end of the photometric flow tube by the suction/discharge mechanism 410, and a liquid lower end surface of the chemical substance solution A is placed in a predetermined distance such as 5 mm above the mouth part. Then, by the nozzle head moving mechanism $51x$ and $51y$, the photometric flow tube $21_6$ of the nozzle head 50 is lifted again and is placed on an upper side of the lens provided at the light receiving end $70_6$ of the light receiving unit 70 of the stage 30 in such a manner that the emitting end $60_6$ provided at a lower end of the plunger 411 that slides in the cylinder 416 coupled to the nozzle $40_6$ and the lens provided at the light receiving end $70_6$ is on a common vertical axis connecting an mouth part $21a$ and an opening part for attachment $21b$ of the photometric flow tube $21_6$ and that the lens provided at the light receiving end $70_6$ is in a predetermined distance (such as 10 mm) below the mouth part $21a$.

In step S3, measurement light, for example, in a range of wavelengths 200 to 850 nm is emitted from the emitting end $60_6$ to the solution C in the photometric flow tube $21_6$, and intensity of transmitted light of the solution C which light is received through the lens provided at the light receiving end $70_6$ is converted into intensity data $I_0$ as an electric signal by the photoelectric conversion unit 720, subtracted from a measurement value of a sample, and used as reference data to calculate absorbance of the sample. The photometric flow tube is disposed from the disposal vent 371 into the disposal box 370 by the detachment member 450.

In step S4, the nozzle head 50 is moved to an upper side of the second column in the second row of the photometric flow tube containing unit group 330 by the nozzle head moving mechanisms $51x$ and $51y$ and the nozzle $40_6$ is moved downward by the nozzle moving unit 420, whereby a new photometric flow tube $21_6$ formed of the black substance is attached to the nozzle $40_6$. After the attached flow tube $21_6$ is lifted by the nozzle moving unit 420, the photometric flow tube $21_6$ is placed above the well in the sixth column in the first row of the microplate 341 by the nozzle head moving mechanisms $51x$ and $51y$ and is moved downward by the nozzle moving unit 420, a prescribed amount of the chemical substance solution A is sucked by the suction/discharge mechanism 410, and a liquid lower end surface of the chemical substance solution A is placed in a predetermined distance such as 5 mm above the mouth part. Then, by the nozzle head moving mechanisms $51x$ and $51y$, the photometric flow tube $21_6$ of the nozzle head 50 is lifted again and is placed on an upper side of the lens provided at the light receiving end $70_6$ of the light receiving unit 70 of the stage 30 in such a manner that the emitting end $60_6$ provided at the lower end of the plunger 411 that slides in the cylinder 416 coupled to the nozzle $40_6$ and the lens provided at the light receiving end $70_6$ are on a common vertical axis connecting a mouth part $20a$ and an opening part for attachment $20b$ of the photometric flow tube $21_6$ and that the lens provided at the light receiving end $70_6$ is in a predetermined distance (such as 10 mm) below the mouth part $20a$. Measurement light at a wavelength in a range of 200 to 850 nm is serially emitted from the emitting end $60_6$ to the solution A in the photometric flow tube $21_6$, and intensity of transmitted light of the solution A which light is received through the lens provided at the light receiving end $70_6$ is converted into intensity data I as an electric signal by the photoelectric conversion unit 720.

Figure 6:
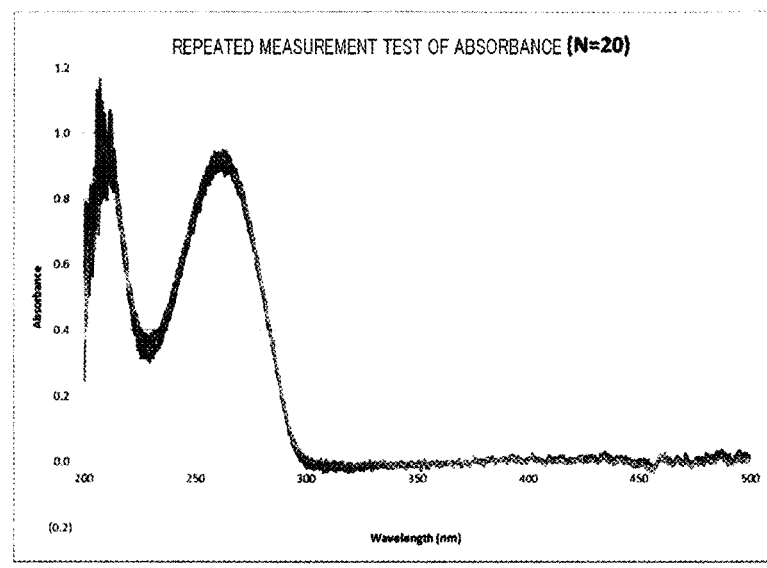
FIG. 6 is a graph illustrating a measurement result according to the first embodiment of the present invention.

In step S5, the absorbance analysis unit 93 of the CPU+ memory+program 9 as the control unit acquires absorbance of the chemical substance solution A on the basis of the intensity data I0 and the intensity data I. Here, a wavelength and absorbance in the range of 200 to 850 nm are calculated, and an average value of absorbance in 350 to 700 nm is calculated for each piece of data and subtracted from the absorbance in 200 to 850 nm for correction of a baseline. A calculated average value (AVG=0.924), standard deviation (SD=0.01), and coefficient of variation (CV=1.56%) of absorbance A260 at a wavelength of 260 nm are illustrated in FIG. 6.

Here, as described above, absorbance at a wavelength λ of the chemical substance solution A is acquired by $A_\lambda = -\log_{10}(I/I_0)$ from previously calculated incident intensity $I_0$. Then, when concentration of the chemical substance solution A is c, by using a known attenuation coefficient ε (molar attenuation coefficient, =0.002 mg/mL) of the chemical substance solution A (dNTP), it is possible to calculate the concentration c by the relational expression $A_\lambda = \varepsilon c L$ from an optical length L=10 mm.

Then, from the absorbance $A_{260}$=0.924 at the wavelength A=260 nm at a peak of the absorbance curve line, the concentration c is 45 to 46 mg/μL. Also, a purification degree of purified DNA can be evaluated by $A_{260}/A_{230}$ and $A_{260}/A_{280}$. When a value of the former is 1.4 or larger and a value of the latter is 1.8 or larger, there is no problem in the purification degree.

Subsequently, a case of measuring absorbance by using an internal standard of the absorbance measuring device 11 according to the embodiment of the present invention will be described on the basis of FIG. 4.

In step S11, for example, 0.022 μM of a chemical substance solution A to be measured (such as dNTP mixture, Takara Bio Inc., Code: 4030, Lot: BH7301B) is previously contained in one well (for example, in sixth column in second row) of the microplate 341 provided on the stage 30 of the absorbance measuring device 11, and a prescribed amount of a solution B (such as bromophenol blue (BPB, blue pigment)) as an internal standard is contained, for example, in a second reagent tank in the four reagent tanks 340. Also, it is assumed that a dispensing flow tube $20_6$ is contained in one flow tube containing unit in the sixth column in the third row of the dispensing flow tube containing unit group 320 and that to dispensing flow tube $20_6$ is also contained in one flow tube containing unit in the sixth column in the fourth row.

In step S12, the nozzle head 50 is moved to an upper side of the sixth column in the third row of the dispensing flow tube containing unit group 320 by the nozzle head moving mechanisms 51x and 51y and the nozzles $40_1$ to $40_n$ is moved downward by the nozzle moving unit 420, whereby the flow tube $20_1$ is attached to the one nozzle $40_1$. After being lifted by the nozzle moving unit 420, the attached flow tube $20_1$ is moved to the sixth column in the second row of the microplate 341 by the nozzle head moving mechanisms 51x and 51y. After the flow tube is moved downward into the liquid containing unit, a prescribed amount is sucked into the the storage unit group regions $31_1$ to $31_{16}$ by the suction/discharge mechanism 410.

The sucked solution A is discharged into a well in the sixth column in the first row of the microplate 342. The flow tube $20_1$ is disposed from the disposal vent 371 into the disposal box 370 by the detachment member 450.

In step S13, the nozzle head 50 is moved again to an upper side of the sixth column in the fourth row of the dispensing flow tube containing unit group 320 by the nozzle head moving mechanisms 51x and 51y and the nozzles $40_1$ to $40_n$ are moved downward by the nozzle moving unit 420, whereby a new flow tube $20_6$ is attached to one of the nozzles $40_1$ to $40_n$. After being lifted by the nozzle moving unit 420, the attached flow tube $20_6$ is moved to an upper side of the second one of the reagent tanks 340 by the nozzle head moving mechanisms 51x and 51y and the flow tube $20_6$ is moved downward by the nozzle moving unit 420, whereby a prescribed amount of the solution B as an internal standard solution is sucked by the suction/discharge mechanism 410. The sucked solution B is discharged into the well in the sixth column in the first row of the microplate 342 and the solution A and the solution B are mixed. Agitation is performed by repetition of suction and discharge. The flow tube is disposed from the disposal vent 371 into the disposal box by the detachment member 450.

In step S14, the nozzle head 50 is moved to an upper side of the second column in the third row of the photometric flow tube containing unit group 330 by the nozzle head moving mechanisms 51x and 51y and the nozzle $40_6$ is moved downward by the nozzle moving unit 420, whereby a photometric flow tube $21_6$ (for example, formed by molding of olefin-based resin such as polypropylene or polyethylene to which resin pigment such as carbon black is kneaded) is attached to the nozzle $40_6$. After the attached flow tube $21_6$ is lifted by the nozzle moving unit 420, the photometric flow tube $21_6$ is placed above the well in the sixth column in the first row of the microplate 342 by the nozzle head moving mechanisms 51x and 51y and moved downward by the nozzle moving unit 420, a prescribed amount a solution AB is sucked by the suction/discharge mechanism 410, and a liquid lower end surface of the chemical substance solution A is placed in a predetermined distance such as 5 mm above the mouth part. Then, by the nozzle head moving mechanisms 51x and 51y, the photometric flow tube $21_6$ of the nozzle head 50 is lifted again and is placed on an upper side of the lens provided at the light receiving end $70_6$ of the light receiving unit 70 on the stage 30 in such a manner that the emitting end $60_6$ provided at the lower end of the plunger 411 that slides in the cylinder 416 coupled to the nozzle $40_6$ and the lens provided at the light receiving end $70_6$ are on a common vertical axis connecting a mouth part 20a and an opening part for attachment 20b of the photometric flow tube $21_6$ and that the lens provided at the light receiving end $70_6$ is in a predetermined distance (such as 10 mm) below the mouth part 20a.

In step S15, measurement light having an optimal wavelength in which light is absorbed by the solution A is emitted from the emitting end $60_6$ to the solution AB in the photometric flow tube $21_6$, and intensity of transmitted light of the solution AB which light is received through the lens provided at the light receiving end $70_6$ is converted into intensity data I as an electric signal by the photoelectric conversion unit 720 of the light receiving unit 70. Standard measurement light having an optimal wavelength which is different from the wavelength and in which light is absorbed by the solution B as the internal standard (such as wavelength around 260 nm in which light absorption is low) is simultaneously or serially emitted from the emitting end $60_6$ to the solution AB in the photometric flow tube $21_6$, and intensity of transmitted light of the solution AB which light is received through the lens provided at the light receiving end $70_6$ is converted into intensity data J as an electric signal by the photoelectric conversion unit 720.

In step S16, the absorbance analysis unit 93 of the CPU+memory+program 9 as the control unit acquires concentration of the chemical substance solution A on the basis of the intensity data I and the intensity data J. That is, as described above, absorbance of the solution A is acquired by $A_1 = -\log_{10}(I/I_0)$ from previously calculated incident intensity $I_0$, and absorbance of the solution B is acquired by $A_0 = -\log_{10}(J/J_0)$ from previously calculated incident intensity $J_0$. Then, when concentration of the solution A is $c_1$ and a known attenuation coefficient $\varepsilon_1$ of the solution A is used, and when the solution B has known concentration $c_0$ and a known attenuation coefficient $\varepsilon_0$ of the solution B is used, the following relational expression is acquired. Note that an optical length L of the solution AB is common in the flow channel.

That is, $c_1 = (A_1 \varepsilon_0 c_0)/(A_0 \varepsilon_1)$ is acquired from $A_1 = \varepsilon_1 c_1 L$ and $A_0 = \varepsilon_0 c_0 L$. Since the expression does not depend on the optical length L, it becomes possible to remove an influence of a slight fluctuation of the optical length L and to acquire a highly reliable result.

Figure 5:
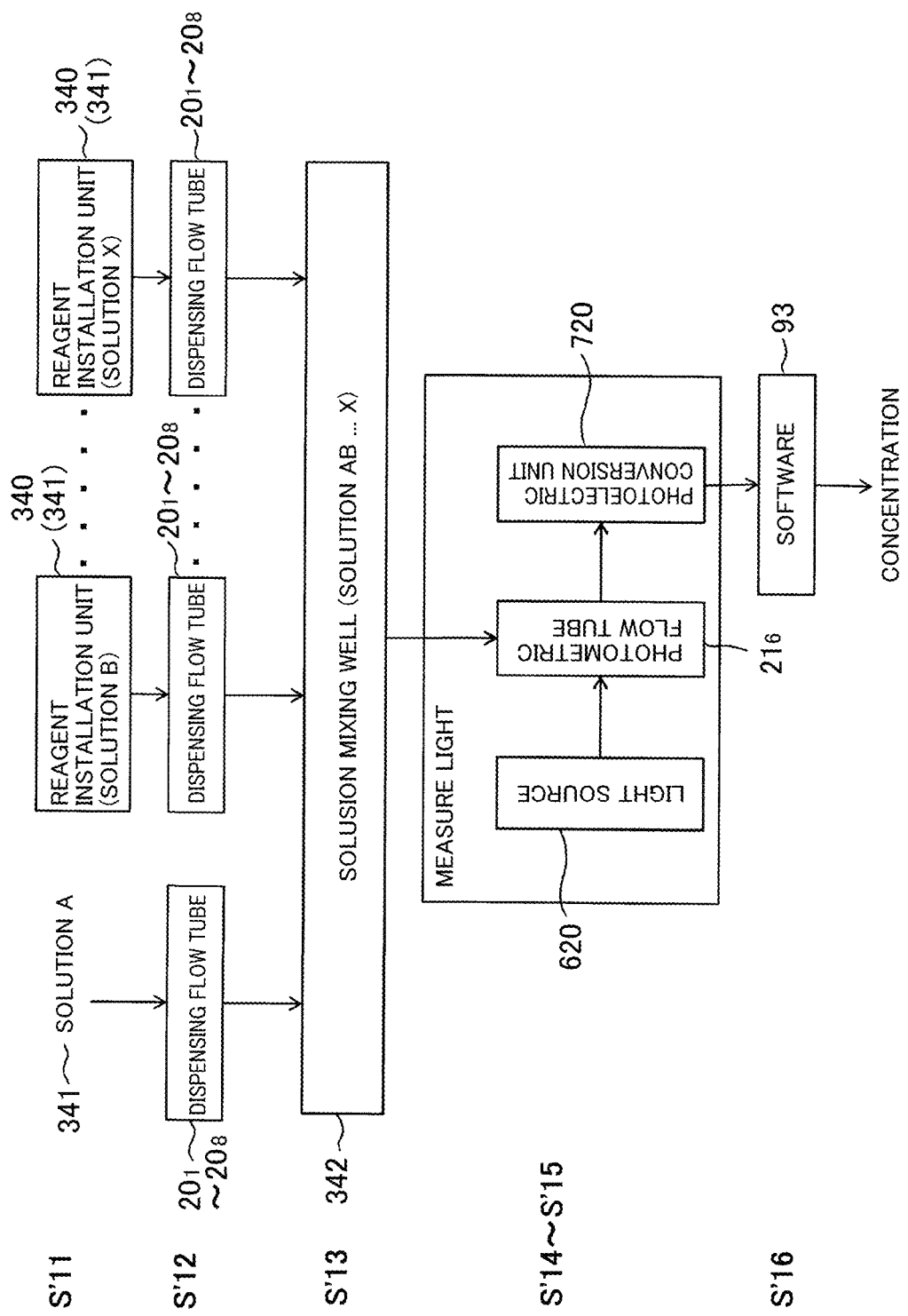
FIG. 5 is a flowchart of different processing according to the first embodiment of the present invention.

FIG. 5 is a flowchart of steps (S'11 to S'16) in a case where a plurality of kinds of chemical substance solutions (A to X) as concentration measurement objects in the microplate 341 or the reagent tanks 340 is measured.

Next, a nozzle head 15, and cartridge containers $13_1$ to $13_8$ as a containing unit group provided in a stage 13 according to a second embodiment of the present invention will be described on the basis of FIG. 7 to FIG. 11.

Figure 7:
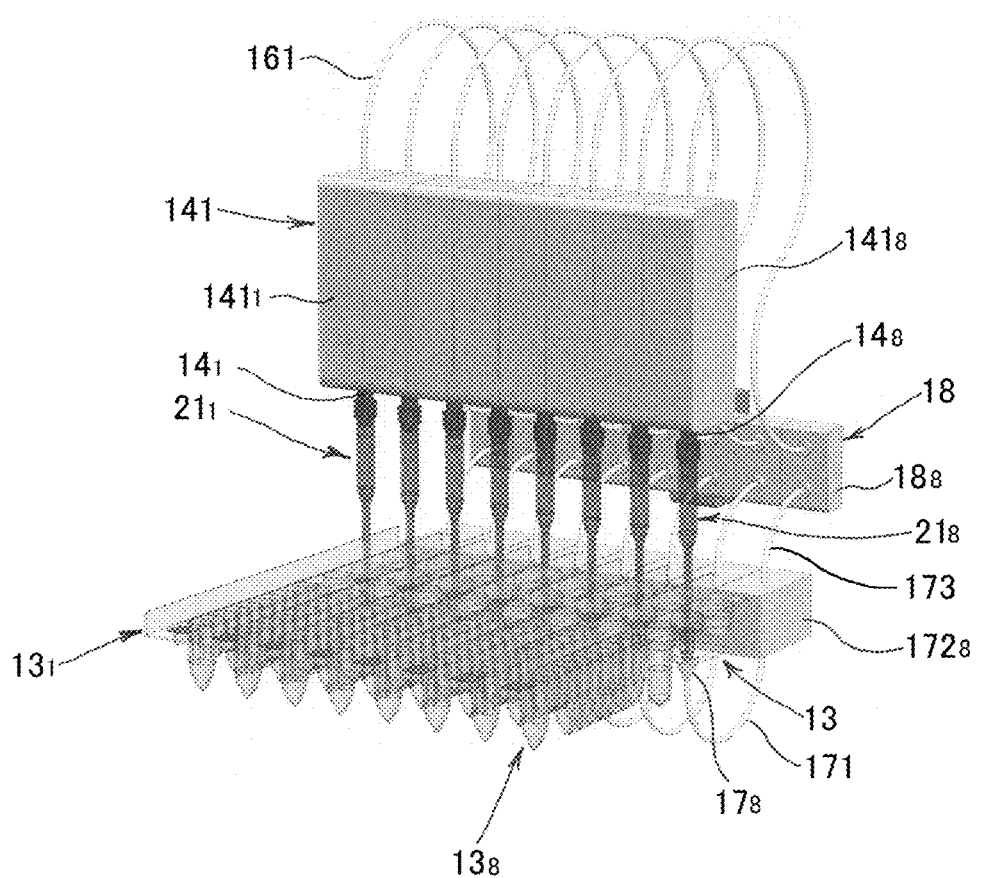
FIG. 7 is a perspective view in which a main part of FIG. 2 according to a second embodiment of the present invention is extracted and illustrated.
Figure 8:
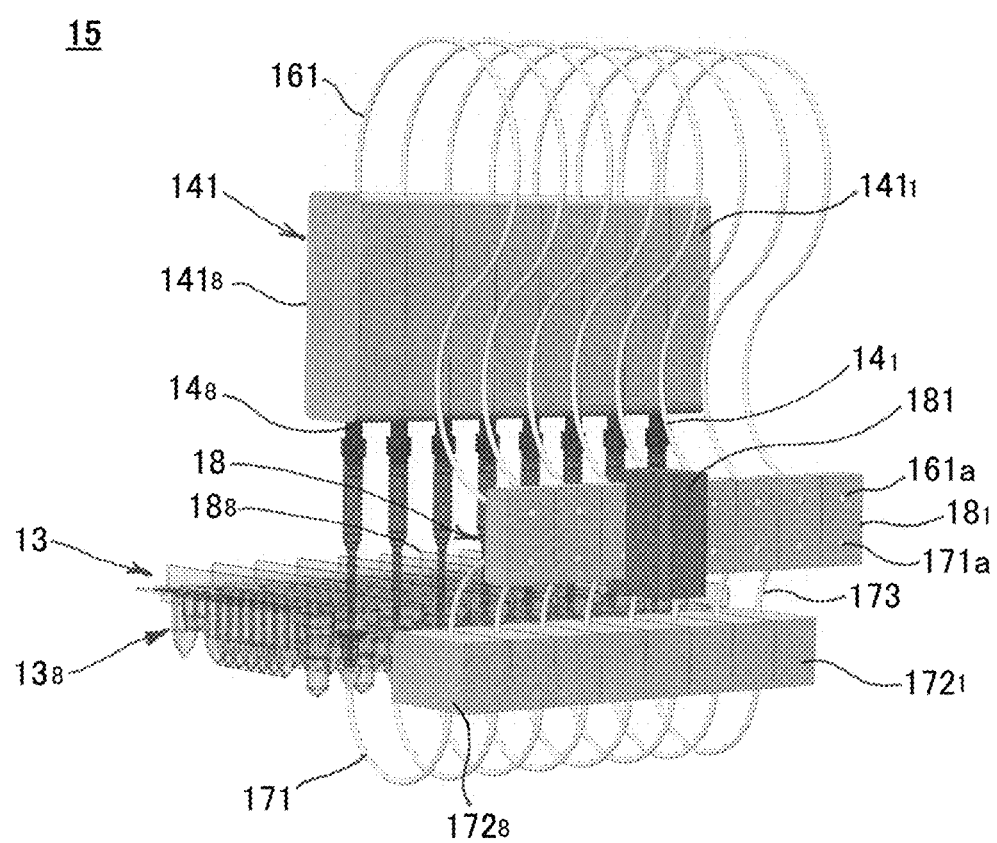
FIG. 8 is a perspective view illustrating a rear side of FIG. 7.

FIG. 7 and FIG. 8 are views illustrating the nozzle head 15 provided instead of the nozzle head 50, and the cartridge containers $13_1$ to $13_8$ respectively including, as the containing unit group, at least a plurality of liquid containing units and reaction containers in the absorbance measuring device 11 illustrated in FIG. 2. The cartridge containers $13_1$ to $13_8$ are provided instead of the reagent tanks 340 and the microplates 341 and 342 in the stage 30 illustrated in FIG. 2. It is assumed that eight other cartridge containers (not illustrated) as a flow tube containing unit group to contain a flow tube are further arrayed, in the stage 13, in an X-axis direction at intervals of rows of the cartridge containers $13_1$ to $13_8$ instead of the (dispensing and photometric) flow tube containing unit groups 320 and 330. Note that what is illustrated in FIG. 2 and has been described in association therewith is used, for example, as a nozzle moving mechanism and the like except for what will be newly described in the following such as a suction/discharge mechanism or the like provided in the nozzle head 15, and a light receiving end or the like provided in the stage.

As illustrated in FIG. 7 and FIG. 8, the nozzle head 15 according to the present embodiment includes a suction/discharge mechanism 141. In the suction/discharge mechanism 141, suction/discharge units $141_1$ to $141_8$ including a plurality of (eight in this example) cylinders are provided and arrayed in an X-axis direction, and nozzles $14_1$ to $14_8$ that communicates with the cylinders are provided at a lower end thereof in a manner of being protruded to a lower side. Also, the nozzle head 15 includes eight photometric flow tubes $21_1$ to $21_8$ including, at lower ends, mouth parts $21a$ that can suck/discharge liquid and that can be inserted into the containing units and including, at upper ends, opening parts for attachment $21b$ detachably attached to the nozzles $14_1$ to $14_8$. Also, as described above, the stage 13 includes the cartridge containers $13_1$ to $13_8$ as a containing unit group in eight columns.

Each of the suction/discharge units $141_1$ to $141_8$ of the suction/discharge mechanism 141 includes a cylinder inside, and a plunger provided in a manner of being slidable in an inner side thereof (see, for example, FIG. 3). The plurality of (eight in this example) nozzles $14_1$ to $14_8$ is respectively provided at lower ends of the cylinders. Optical fibers 161 are respectively provided through the inside of the nozzles $14_1$ to $14_8$. Leading ends of the optical fibers 161 are respectively provided at emitting ends $16_1$ to $16_8$ and on common vertical axes of the flow tubes $21_1$ to $21_8$ at lower ends of the nozzles $14_1$ to $14_8$. Rear ends of the optical fibers 161 are provided as first connection ends $161a$ and are arrayed at equal intervals along a first straight line on a connection surface of connection end array plates $18_1$ to $18_8$.

Figure 9:
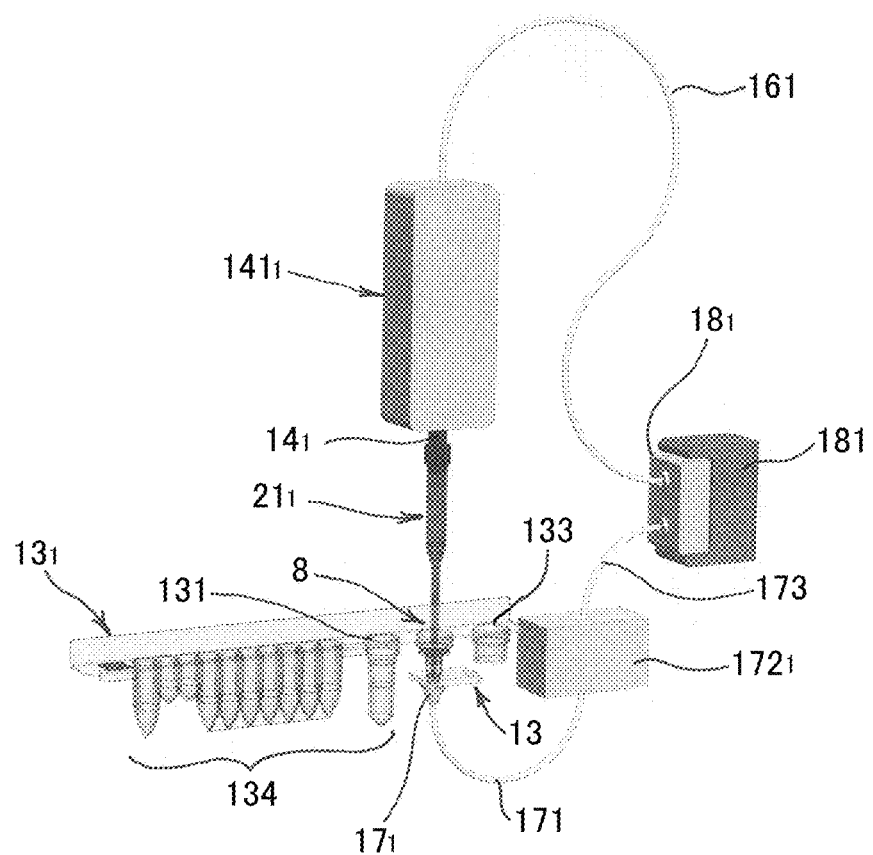
FIG. 9 is a perspective view in which a part of FIG. 8 is extracted and illustrated.

As illustrated in FIG. 9, ten liquid containing units 134, reaction containers 131 and 133 in which a temperature can be controlled, and a photometric container 8 are arrayed in one column in a Y-axis direction in each of the cartridge containers $13_1$ to $13_8$ in the stage 13. Light receiving ends $17_1$ to $17_8$ each of which includes a leading end of an optical fiber 171 are provided on a lower side of the photometric container 8 and on a downside of the stage 13. Rear ends of the optical fibers 171 are optically connected to spectroscopes $172_1$ to $172_8$ and the leading ends thereof are optically connected to the spectroscopes $172_1$ to $172_8$. The rear ends are provided as second connection ends $171a$ and are arrayed at equal intervals along a second straight line on the connection surface of the connection end array plates $18_1$ to $18_8$. The second straight line is extended in parallel with the first straight line at a predetermined interval.

In each of the connection end array plates $18_1$ to $18_8$, a measurement end moving device 181 slidable in the X-axis direction is included, and a first measurement end and a second measurement end that are respectively moved along the first straight line and the second straight line and that can be serially and respectively connected to the first connection end $161a$ and the second connection end $171a$ are respectively provided along the first straight line and the second straight line at the predetermined interval. The first measurement end is optically connected to a light source 620 via a light guiding path such as an optical fiber, and the second measurement end is optically connected to a photoelectric conversion unit 720 via a light guiding path such as an optical fiber. The connection end array plates $18_1$ to $18_8$ and the measurement end moving device 181 correspond to a switching unit 18 including the emission switching unit and the light-reception switching unit that respectively switch connection between a plurality of (eight in this example) emitting ends and one light source and connection between a plurality of (eight in this example) light receiving ends and one photoelectric conversion unit 720.

Note that the spectroscopes $172_1$ to $172_8$ are devices to extract transmitted light at a designated wavelength from transmitted light of the chemical substance solution, which light is received at the light receiving ends $17_1$ to $17_8$, by using dispersion by a diffraction grating or a prism, and are set, for example, to a wavelength of designated measurement light. Accordingly, even when measurement light is white light, it is possible to guide transmitted light at a predetermined wavelength or in a predetermined wavelength region to a light receiving unit, to measure intensity thereof, and to measure absorbance at the predetermined wavelength or in the predetermined wavelength region.

Figure 10:
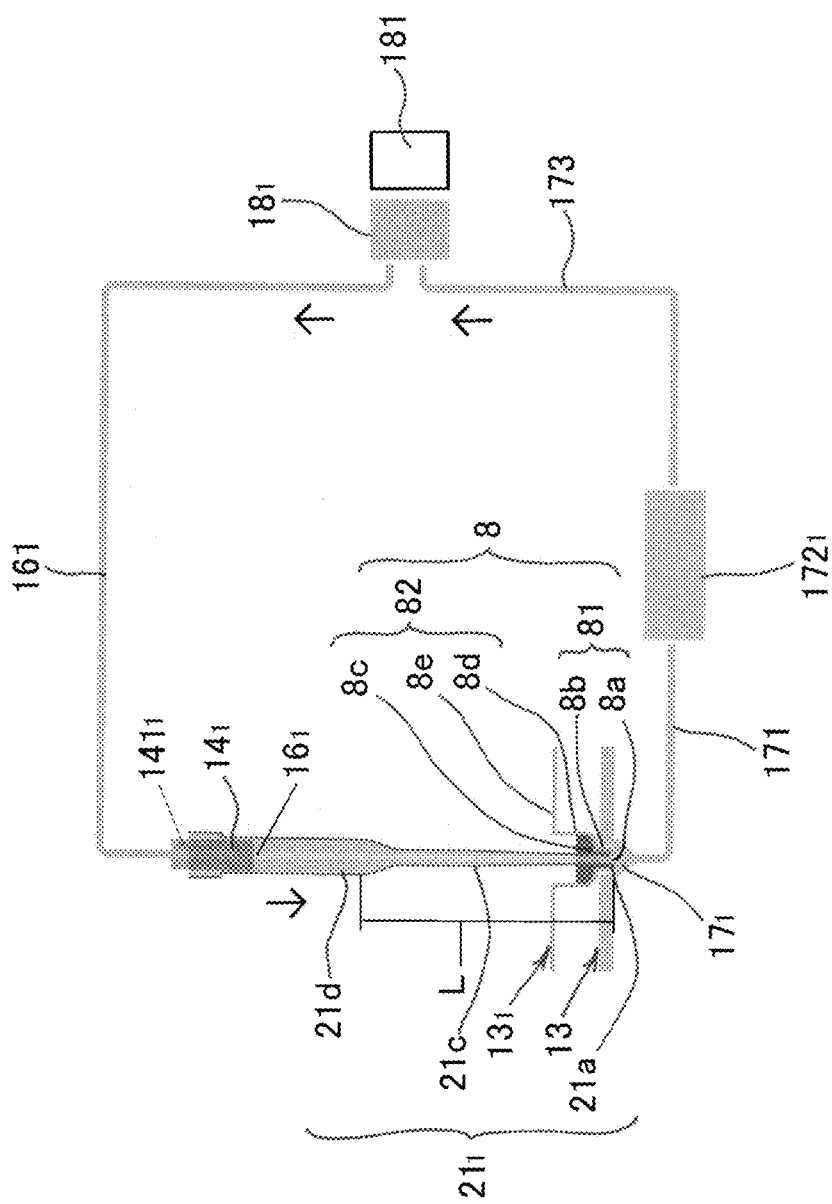
FIG. 10 is a partial cross section description view conceptually illustrating a main part of FIG. 9.
Figure 11:
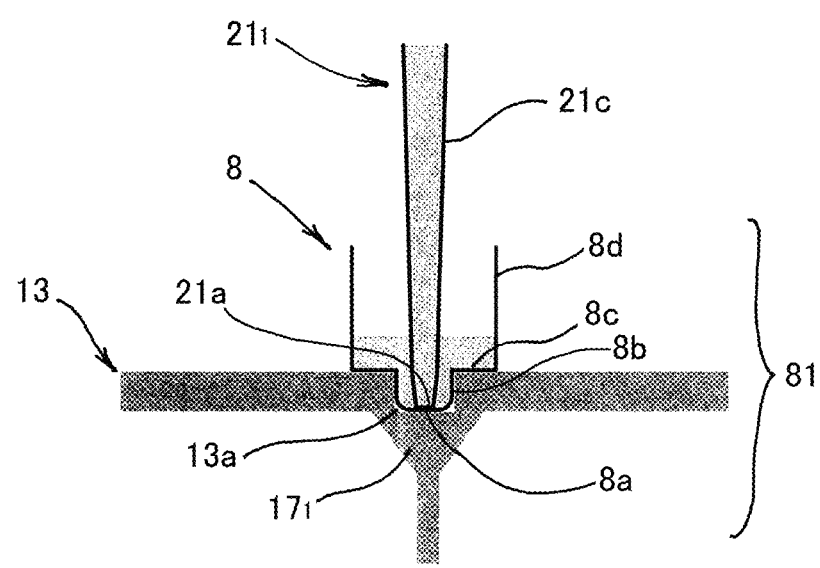
FIG. 11 is a cross section conceptual view illustrating a part of FIG. 9 in an enlarged manner.

FIG. 10 and FIG. 11 are views illustrating an outline of an optical system and a usage state of the photometric container 8 according to the second embodiment.

The photometric container 8 is provided in the stage 13 as one of liquid containing units of each of the cartridge containers $13_1$ to $13_8$, includes a bottom part $8c$ which is close to an upper side of the light receiving ends $17_1$ to $17_n$ and in which a translucent region having translucency with respect to the measurement light is formed, and includes a tubular recessed part 81 to which a lower end part of each of light-blocking photometric flow tubes $21_1$ to $21_8$, which are the flow tubes to which a black pigment is kneaded, can be inserted or loosely inserted from an upper side and which is formed at a center of the bottom part $8c$. The translucent region is formed in a narrow bottom part $8a$ of the recessed part 81. A narrow sidewall part $8b$ of the recessed part 81 is formed to have a light blocking effect with respect to outside light with a black pigment being kneaded in molding. A sign $8d$ indicates a sidewall part, $8e$ indicates a substrate of each of the cartridge containers $13_1$ to $13_8$, and a sign 82 indicates a tubular liquid containing unit (well) which is formed in each of the cartridge containers $13_1$ to $13_8$ and at a center of which the recessed part 81 is formed.

As illustrated in FIG. 10 or FIG. 11, the recessed part 81 is provided in such a manner as to be loosely inserted into a hole provided in a plate of the stage 13. Also, a state in which a lower end part of a narrow tube part $21c$ of a photometric flow tube $21_1$ as the flow tube is inserted into the recessed part 81 and a mouth part $21a$ is abutted to the narrow bottom part $8a$ in the photometric container 8 is illustrated. A state in which the narrow bottom part $8a$ is close to or appressed to a light receiving end surface of each of the light receiving ends 171 to 178, a solution 4 that is to be measured and is sucked into the photometric flow tube $21_1$ is contained without an air layer being formed from an upper end surface of liquid to the light receiving end surface, and an optical length L is formed is illustrated.

Next, a case where the photometric container 8 illustrated in FIG. 10 or FIG. 11 is provided on an upper side of each of the light receiving ends 17$_1$ to 17$_8$ in the stage 13 and used will be described.

In step S'1, for example, 0.022 μM of a chemical substance solution A to be measured (such as dNTP mixture, Takara Bio Inc., Code: 4030, Lot: BH7301B) is previously contained in one well (for example, in first row) of each of the cartridge containers 13$_1$ to 13$_8$ provided on the stage 13 of the absorbance measuring device 11, and a reference solution C (such as TE, 10 mM Tris-HCl, 1 mM EDTA, pH 8.0) as a blank sample for reference measurement in which light is not absorbed is contained in a different well (for example, in second row). Also, it is assumed that dispensing flow tubes 20$_1$ to 20$_8$ are contained in flow tube containing units in the first and second rows of the different cartridge container of a flow tube containing unit group (not illustrated) and that photometric flow tubes 21$_1$ to 21$_8$ are contained in flow tube containing units in the third and fourth rows. Note that a description of processing of using a dispensing flow tube before using a photometric flow tube is omitted.

In step S'2, the nozzle head 15 is moved to an upper side of the third row of each of the different cartridge containers (flow tube containing unit) by the nozzle head moving mechanisms 51*x* and 51*y* and the nozzles 14$_1$ to 14$_8$ are moved downward by the nozzle moving unit 420, whereby the photometric flow tubes 21$_1$ to 21$_8$ formed of a black substance (for example, formed by molding of olefin-based resin such as polypropylene or polyethylene to which resin pigment such as carbon black is kneaded) are attached to the nozzles 14$_1$ to 14$_8$. After the attached flow tubes 21$_1$ to 21$_8$ are lifted by the nozzle moving unit 420, the photometric flow tubes 21$_1$ to 21$_8$ are placed above the wells in the second row of the cartridge containers 13$_1$ to 13$_8$ by the nozzle head moving mechanisms 51*x* and 51*y* and are moved downward by the nozzle moving unit 420, and around 10 mm (around 7.6 μL) of a prescribed amount of the reference solution C is sucked from a leading end of each of the photometric flow tubes by the suction/discharge mechanism 141. After being lifted again, the photometric flow tubes 21$_1$ to 21$_8$ of the nozzle head 15 are placed by the nozzle head moving mechanisms 51*x* and 51*y* on an upper side of the photometric container 8 provided on an upper side of the light receiving ends 17$_1$ to 17$_8$ of the light receiving unit 70 in the stage 13 in such a manner that the recessed part 81 of each of the photometric containers 8 is on a common vertical axis connecting a mouth part 21*a* and an opening part for attachment 21*b* of each of the photometric flow tubes 21$_1$ to 21$_8$ and that the light receiving ends 17$_1$ to 17$_8$ are on a lower side of the mouth parts 21*a*. Next, the photometric flow tubes are simultaneously moved downward by the nozzle moving unit 420, whereby each of the leading end parts of the photometric flow tubes is inserted into the recessed part 81 and a mouth part 21*a* is abutted to the narrow bottom part 8*a*.

In step S'3, measurement light, for example, in a range of wavelengths 200 to 850 nm is emitted from the emitting ends 16$_1$ to 16$_8$ to the solution C in the photometric flow tubes 21$_1$ to 21$_8$, and intensity of transmitted light of the solution C which light is received through a lens provided at each of the light receiving ends is converted into intensity data I$_0$ as an electric signal by the photoelectric conversion unit 720, subtracted from a measurement value of a sample, and used as reference data to calculate absorbance of the sample. The photometric flow tube is disposed from the disposal vent 371 into the disposal box 370 by the detachment member 450.

Here, by operation of the suction/discharge mechanism 141, the mouth parts 21*a* of the photometric flow tubes 21$_1$ to 21$_8$ are abutted to the narrow bottom parts 8*a* in such a manner that an air layer is not included in an upper side of the mouth parts 21*a* in the photometric flow tubes 21$_1$ to 21$_8$.

In step S'4, the nozzle head 15 is moved to an upper side of the fourth row of the flow tube containing units by the nozzle head moving mechanisms 51*x* and 51*y* and the nozzles 14$_1$ to 14$_8$ are moved downward by the nozzle moving unit 420, whereby new photometric flow tubes 21$_1$ to 21$_8$ (for example, formed by molding of olefin-based resin such as polypropylene or polyethylene to which resin pigment such as carbon black is kneaded) are attached to the nozzles 14$_1$ to 14$_8$. After the attached flow tubes 21$_1$ to 21$_8$ are lifted by the nozzle moving unit 420, the photometric flow tubes 21$_1$ to 21$_8$ are placed above the wells in the first row of the cartridge containers 13$_1$ to 13$_8$ by the nozzle head moving mechanisms 51*x* and 51*y* and are moved downward by the nozzle moving unit 420, and a prescribed amount of the chemical substance solution A is sucked by the suction/discharge mechanism 410. After being lifted again, the photometric flow tubes 21$_1$ to 21$_8$ of the nozzle head 15 are placed by the nozzle head moving mechanisms 51*x* and 51*y* on an upper side of cleaned photometric containers 8 provided on an upper side of the light receiving ends 17$_1$ to 17$_8$ in the stage 13 in such a manner that the recessed part 81 of each of the photometric containers 8 is on a common vertical axis connecting a mouth part 21*a* and an opening part for attachment 21*b* of each of the photometric flow tubes 21$_1$ to 21$_6$ and that the light receiving ends 17$_1$ to 17$_8$ are on a lower side of the mouth parts 21*a*. Then, the photometric flow tubes 21$_1$ to 21$_8$ are simultaneously moved downward by the nozzle moving unit 420, whereby leading end parts 21*a* of the photometric flow tubes 21$_1$ to 21$_8$ are loosely inserted into the recessed parts 81 and the mouth parts 21*a* are abutted to the narrow bottom parts 8*a*.

Here, by operation of the suction/discharge mechanism 141, the mouth parts 21*a* of the photometric flow tubes 21$_1$ to 21$_8$ are abutted to the narrow bottom parts 8*a* with a part of the solution being contained in the recessed parts in such a manner that an air layer is not included in an upper side of the mouth parts 21*a* in the photometric flow tubes 21$_1$ to 21$_8$. The narrow bottom parts 8*a* are close to or appressed to light receiving end surfaces of the light receiving ends 17$_1$ to 17$_8$. Thus, according to the present embodiment, positioning is securely performed by loose insertion or insertion of each of the photometric flow tubes 21$_1$ to 21$_8$ into the recessed part 81, and movement of a solution through the mouth part 21*a* is prevented by removal of an air layer from an upper end surface of liquid to a light receiving end surface, whereby it becomes possible to acquire a stable optical length L.

Measurement light at a wavelength in a range of 200 to 850 nm is serially emitted from the emitting ends 16$_1$ to 16$_8$ to a solution A in the photometric flow tube 21$_6$, and intensity data I as an electric signal is acquired by the photoelectric conversion unit 720 from intensity of transmitted light of the solution A which light is received through light receiving ends 17$_1$ to 17$_8$.

In step S'5, the absorbance analysis unit 93 of the CPU+memory+program 9 as the control unit acquires absorbance of the chemical substance solution A on the basis of the intensity data I$_0$ and the intensity data I.

Here, as described above, absorbance at a wavelength λ of the chemical substance solution A is acquired by $A_\lambda = -\log_{10}$ ($I/I_0$) from previously calculated incident intensity $I_0$. Then, when concentration of the chemical substance solution A is c, by using a known attenuation coefficient ε (molar attenuation coefficient, =0.002 mg/mL) of the chemical substance solution A (dNTP), it is possible to calculate the concentration c by the relational expression $A_\lambda = \varepsilon c L$ from an optical length L=10 mm.

In the present embodiment, since an emitting end is provided at a lower end of each of the nozzles or a lower end of a plunger, it is possible to securely guide emitted measurement light into a flow tube and to perform emission highly efficiently. Specifically, since a material opaque with respect to measurement light is used for a flow tube, it becomes possible to prevent leakage of the measurement light to the outside and to calculate highly accurate absorbance. It becomes possible to emit measurement light. Also, in a case where the photometric container is used, it is possible to securely place the emitting end and the light receiving end on the common vertical axis, to prevent movement of liquid through a mouth part, to remove an air layer, to accurately determine an optical length, and to acquire highly accurate absorbance. Also, even in a case where the photometric container is not used, by providing a void from a mouth part in a narrow tube of a flow tube, it is possible to prevent movement of a solution from the mouth part, to determine an optical length, and to acquire highly accurate absorbance.

Each of the embodiments described above is described in detail to make it easier to understand the present invention more deeply and is not to limit a different embodiment. Thus, it is possible to make modification within the spirit and the scope of the invention.

For example, only a case where concentration is measured with only one kind of chemical substance solution A as an object of concentration measurement has been described. However, it is possible to measure concentration of each of a plurality of kinds of chemical substances by mixing a plurality of kinds of chemical substance solutions B, . . . , and X and by emitting a plurality of kinds of measurement light optimal to each of the chemical substance solutions B, . . . , and X.

Also, when a diluent is used instead of an internal standard, it becomes possible to measure absorbance of a diluted chemical substance solution.

In the above description, a case where a light source and an emitting end are provided in a nozzle head, and a photoelectric conversion unit and a light receiving end are provided in a stage has been described in detail. However, this case is not a limitation, and it is also possible to provide a light source and an emitting end in a stage and to provide a photoelectric conversion unit and a light receiving end in a nozzle head. Also, only a case of using one flow tube has been described. However, this case is not a limitation and processing and measurement may be performed in parallel by utilization of a plurality of pairs of flow tubes.

Also, absorbance is measured with a spectroscope being used on a side of a light receiving unit in the above description. However, it is also possible to perform measurement by using a filter. In a case where a multichannel spectroscope or the like that includes a photoelectric conversion unit inside is used as a spectroscope, the light-reception switching unit is not necessary. Also, a spectroscope or a filter may be used on a side of an emission unit.

Also, a nucleic acid is a chemical substance to be measured in the above description. However, this case is not a limitation, and a different high-molecular substance such as an amino acid, protein, a sugar chain, or fat, a solid such as a magnetic body, or a chemical substance solution in various fluid volumes which solution includes various chemical substances and which solution is, for example, foam, gas, or liquid may be used.

Moreover, in the above description, only a case where concentration of a chemical substance is calculated on the basis of absorbance has been described. However, this case is not a limitation and, for example, the above-described enzymatic activity, reaction rate, and the like can be calculated.

Moreover, a shape, a structure, and a function of each of the configuration elements described above are not limited to an example described in an embodiment. For example, in the above description, a case where a timing belt is used as a nozzle head moving mechanism and a ball screw is used as a nozzle moving unit has been described. However, a timing belt and a ball screw can be arbitrarily replaced and a similar configuration can be acquired even when a different mechanism is used.

INDUSTRIAL APPLICABILITY

The present invention relates to an absorbance measuring device and a method thereof. The present invention relates to various fields that are fields requiring handling of a biopolymer or biological low-molecular compound such as a gene, an immune system, an amino acid, protein, or sugar and are, for example, an industrial field, an agricultural field such as food, agroprocessing, or fish processing, a pharmaceutical field, a medical field such as sanitation, security of health, immunity, illness, or heredity, and a science field such as chemistry or biology. The present invention is specifically effective in a case where a series of processing using many reagents or substances is successively executed in predetermined order.

REFERENCE SIGNS LIST 10, 11 absorbance measuring device
$2_1$ to $2_n$ flow tube
$20_1$ to $20_n$ dispensing flow tube
$21_1$ to $21_n$ photometric flow tube
3, 13, 30 stage
$3_1$ to $3_n$, ($13_1$ to $13_n$) containing unit group (cartridge container)
$31_1$ to $31_n$, 310, 131, 133 reaction container
$32_1$ to $32_n$, 320 dispensing flow tube containing unit
$33_1$ to $33_n$, 330 photometric flow tube containing unit
$34_1$ to $34_n$, (341, 342) liquid containing unit group (microplate)
$4_1$ to $4_n$, $40_1$ to $40_n$, $14_1$ to $14_n$ nozzle
41, 410, 141 suction/discharge mechanism
5, 15, 50 nozzle head
51 nozzle head moving mechanism
6, 60 emission unit
$6_1$ to $6_n$, $60_6$, $16_1$ to $16_n$ emitting end
61, 71, 710, 161, 171, 173 light guiding path
62, 620 light source
7, 70 light receiving unit
$7_1$ to $7_n$, $70_6$, $17_1$ to $17_n$ light receiving end
72, 720 photoelectric conversion unit
8 photometric container
9 CPU+memory+program
18 switching unit
93 absorbance analysis unit

The invention claimed is:

1. An absorbance measuring device comprising:
    one or more liquid containing units, each of the liquid containing units holding one or more chemical substance solutions to be measured;
    a suction and discharge mechanism having one or more cylinders;
    one or more nozzles that communicate with the one or more cylinders of the suction and discharge mechanism;
    one or more flow tubes, each flow tube extending from a lower end to an upper end and comprising a mouth part at the lower end configured to be inserted into each of the liquid containing units, and an opening part at the upper end configured to detachably receive a nozzle;
    one or more optical emitting fibers, each optical emitting fiber having a rear portion that is optically connected to a light source and a leading portion that terminates at an emitting end, wherein the emitting end is coupled to a plunger that slides within the one or more cylinders of the suction and discharge mechanism and wherein the emitting end is configured to emit measurement light from the light source;
    one or more optical receiving fibers, each optical receiving fiber optically connected to a photoelectric conversion unit and configured to receive measurement light from the emitting end at a light receiving end; and
    a control unit operably coupled to the suction and discharge mechanism, the light source, and the photoelectric conversion unit, the control unit configured to:
        transmit a signal to the suction and discharge mechanism to suck one or more prescribed amounts of the one or more chemical substance solutions into the one or more flow tubes;
        transmit a signal to the light source to emit the measurement light from the emitting ends in a vertical direction through the one or more flow tubes; and
        determine one or more absorbance values of the one or more chemical substance solutions based on one or more intensity data signals received from the photoelectric conversion unit, the one or more intensity data signals based on one or more intensities of the measurement light received at the light receiving ends.

2. The absorbance measuring device according to claim 1, wherein the liquid containing units and the optical emitting fibers are provided in a stage, and wherein the absorbance measuring device further comprises:
    a nozzle moving mechanism that is configured to move the nozzles with respect to the stage, and
    wherein the control unit is further configured to transmit a signal to the nozzle moving mechanism to move the nozzles with respect to the stage.

3. The absorbance measuring device according to claim 2, further comprising an emission switching unit that switches optical connection between the one or more emitting ends and the light source, or a light-reception switching unit that switches optical connection between the one or more light receiving ends and the photoelectric conversion unit.

4. The absorbance measuring device according to claim 1, further comprising a reaction container in addition to the one or more liquid containing units, wherein at least one of the following is a photometric container having a bottom part comprising a translucent region through which the measurement light is transmitted: 1) the one or more liquid containing units and 2) the reaction container.

5. The absorbance measuring device according to claim 4, wherein the flow tubes further comprise a flow tube light blocking member configured to prevent ingression of outside light into the chemical substance solution to be measured;
    wherein the bottom part of the photometric container includes a base part and a sidewall part connected to the base part and extending upwardly therefrom, the sidewall part comprising a container light blocking member configured to prevent ingression of outside light into the chemical substance solution to be measured, and
    wherein a lower end part of the flow tube is configured be inserted from an upper side into the bottom part of the photometric container.

6. The absorbance measuring device according to claim 1, wherein the one or more chemical substance solutions comprise an internal standard solution of known concentration, and
    wherein the measurement light comprises standard measurement light that can be absorbed by the internal standard solution.

7. The absorbance measuring device according to claim 1, wherein the one or more chemical substance solutions comprise a diluent.

8. An absorbance measuring method comprising:
    transmitting, by a control unit, a signal to a suction and discharge mechanism having one or more cylinders to suck one or more prescribed amounts of one or more chemical substance solutions from one or more liquid containing units using one or more nozzles that communicate with the one or more cylinders of the suction and discharge mechanism, wherein the one or more chemical substance solutions are sucked into one or more flow tubes coupled to the one or more nozzles, and wherein each flow tube extends from a lower end to an upper end and comprises a mouth part at the lower end configured to be inserted into each of the liquid containing units, and an opening part at the upper end configured to detachably receive a nozzle;
    transmitting, by the control unit, a signal to a light source to emit measurement light from emitting ends of one or more optical emitting fibers in a vertical direction, wherein each optical emitting fiber has a rear portion that is optically connected to the light source and a leading portion that terminates at the emitting end, wherein each emitting end is coupled to a plunger that slides within the one or more cylinders of the suction and discharge mechanism; and
    determining, by the control unit, one or more absorbance values of the one or more chemical substance solutions based on one or more intensity data signals received from a photoelectric conversion unit, the one or more intensity data signals based on one or more intensities of the measurement light received at light receiving ends of one or more optical receiving fibers, wherein each optical receiving fiber is optically connected to the photoelectric conversion unit.

9. The absorbance measuring method according to claim 8, wherein the liquid containing units and the optical emitting fibers are provided in a stage, and wherein the absorbance measuring method further comprises:
    transmitting, by the control unit, a signal to a nozzle moving mechanism to relatively move the nozzles with respect to the stage.

10. The absorbance measuring method according to claim 8, wherein the measurement light emitting step includes an optical connection switching step of switching optical connection between the one or more emitting ends and the light source or between the one or more light receiving ends and the photoelectric conversion unit.

11. The absorbance measuring method according to claim 8, wherein a reaction container is further provided in addition to the one or more liquid containing units; and
   wherein at least one of the following is a photometric container having a bottom part comprising a translucent region through which the measurement light is transmitted: 1) the one or more liquid containing units and 2) the reaction container.

12. The absorbance measuring device according to claim 2, further comprising a reaction container in addition to the one or more liquid containing units, wherein at least one of the following is a photometric container having a bottom part comprising a translucent region through which the measurement light is transmitted: 1) the one or more liquid containing units and 2) the reaction container.

* * * * *